(12) United States Patent
Triarsi et al.

(10) Patent No.: US 6,170,596 B1
(45) Date of Patent: Jan. 9, 2001

(54) RACING GO-CART VEHICLE

(75) Inventors: Onofrio Triarsi, Elizabeth, NJ (US); Isaia Fiocco, Paruzzaro (IT)

(73) Assignee: Challenge Karts U.S.A., Inc., Elizabeth, NJ (US)

( * ) Notice: Under 35 U.S.C. 154(b), the term of this patent shall be extended for 0 days.

(21) Appl. No.: 09/178,095

(22) Filed: Oct. 23, 1998

(51) Int. Cl.[7] ................. B62D 21/10; B62D 63/02; B60K 20/06
(52) U.S. Cl. ................. 180/291; 180/336; 180/311; 180/908; 280/781; 280/782; 280/86.751; 280/93.502; 280/756
(58) Field of Search ................. 180/291, 299, 180/336, 311, 908; 280/86.75, 86.751, 86.756, 86.757, 781, 782, 756, 5.512, 93.502; 74/473 R, 484 R

(56) References Cited

U.S. PATENT DOCUMENTS

| | | | |
|---|---|---|---|
| 2,605,118 | * | 4/1952 | Booth et al. ................. 280/86.756 |
| 2,914,339 | * | 11/1959 | Gouirand ................. 280/782 |
| 3,096,994 | * | 7/1963 | Primeau et al. ................. 280/86.751 |
| 3,570,636 | * | 3/1971 | Franz et al. ................. 192/3.57 |
| 4,441,379 | * | 4/1984 | Malkowski et al. ................. 74/477 |
| 4,453,763 | * | 6/1984 | Richards ................. 296/185 |
| 5,014,802 | * | 5/1991 | Knoll et al. ................. 180/140 |
| 5,065,135 | * | 11/1991 | Leigh-Monstevens et al. ..... 340/463 |
| 5,069,476 | * | 12/1991 | Tsutsumi et al. ................. 280/707 |
| 5,086,858 | * | 2/1992 | Mizuta et al. ................. 180/68.3 |
| 5,199,526 | * | 4/1993 | Derviller ................. 180/297 |
| 5,335,743 | * | 8/1994 | Gillbrand et al. ................. 180/178 |
| 5,529,388 | * | 6/1996 | Yasui ................. 303/116.1 |
| 5,558,368 | * | 9/1996 | Cerny et al. ................. 280/781 |
| 5,603,674 | * | 2/1997 | Rivas et al. ................. 477/170 |

* cited by examiner

*Primary Examiner*—Peter C. English
(74) *Attorney, Agent, or Firm*—Ezra Sutton

(57) ABSTRACT

A racing go-cart vehicle includes a chassis having a top surface, a bottom surface, and front, rear and mid portions; a pair of steerable front wheels and a pair of rear wheels having at least one drive wheel and supporting the chassis; and a body-shell cover attached to the chassis. The racing go-cart vehicle also includes a steering wheel having buttons thereon for push-button shifting; a tie rod operatively connected to the front wheels; a steering column connecting the steering wheel and the tie rod; and a universal joint assembly for articulating the steering column. The racing go-cart vehicle further includes a braking system having a bias control member and an equalizer control assembly attached to the front and rear wheels; the wheels each having an adjustable suspension assembly connected thereto; an engine mounted on the mid portion of the chassis; a transmission system assembly adapted to transfer the output of the engine to the rear drive wheels. Additionally, the racing go-cart vehicle further includes a gas pedal for regulating the speed of the engine; a brake pedal for actuating the braking system for stopping the vehicle; and a single adjustable seat for supporting a driver of the vehicle.

23 Claims, 16 Drawing Sheets

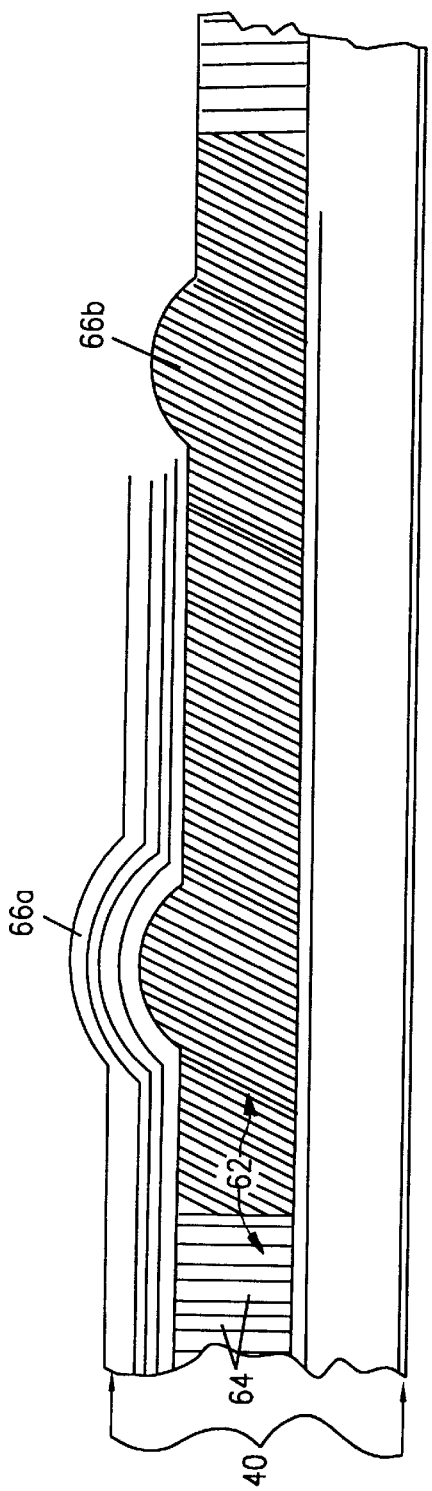
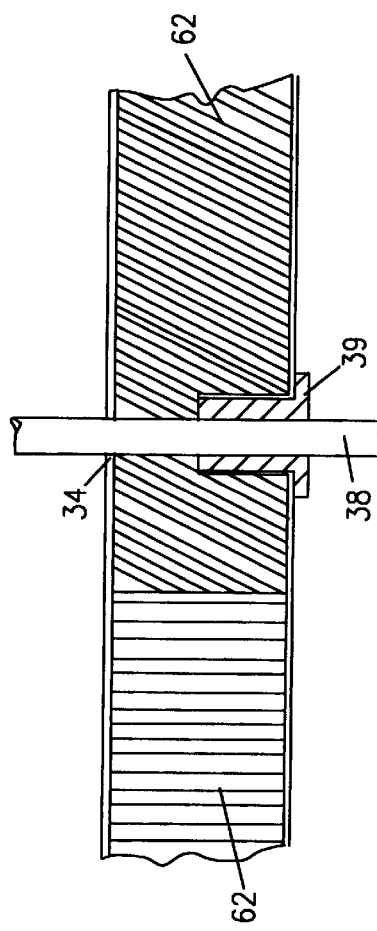
FIG. 4A
FIG. 4B

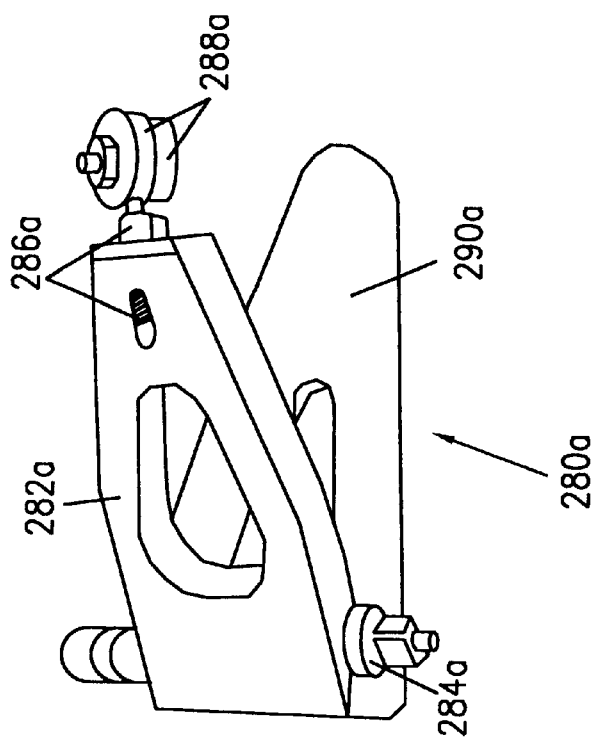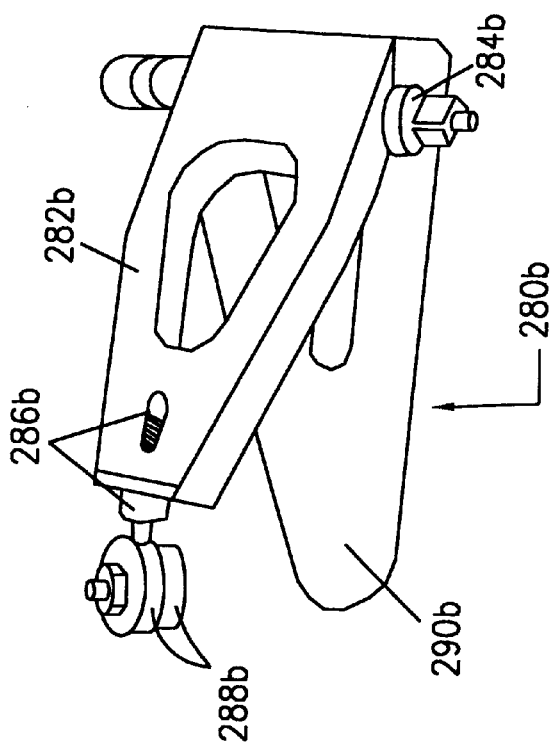
FIG. 7

RACING GO-CART VEHICLE

FIELD OF THE INVENTION

This invention relates to a go-cart vehicle used for racing and recreational entertainment. More particularly, the racing gocart vehicle of this invention has improved vehicular features that include an aerodynamic configuration, an electronic shifter with air actuators, a carbon-fiber chassis, a KEVLAR™ body-shell cover, a steering wheel with push-button shifting, four wheel disc brakes with bias control between front and rear brakes, and an adjustable suspension. These vehicular features provide for increased user safety when in operation by the driver; and for longer durability of the go-cart vehicle and its component parts in order to lower maintenance costs, replacement parts costs, and repair labor costs.

BACKGROUND OF THE INVENTION

Go-cart type vehicles have been used for recreational and racing entertainment for the past half-century where special go-cart race tracks have been constructed and dedicated to go-cart racing. These dedicated go-cart race tracks have been made of dirt, clay, macadam, asphalt or concrete materials for year round use by the public and private racing promotions for go-cart vehicles. The racing image is preferred by many of the go-cart users being adults, teenagers and juveniles, such that these go-cart drivers feel the experience of racing in a miniaturized single-seater racing car that are akin to the professional racing cars on the pro-track racing circuit (e.g. Daytona 500, Indianapolis 500, etc.).

The sport of go-cart racing typically involves a plurality of motorized go-carts racing one or more times around a track, with the object being to cross a predetermined finish line ahead of the other go-carts. Go-cart race tracks are traditionally oval in shape, and the go-carts race in a counterclockwise direction. On an oval track, therefore, the go carts must continuously negotiate tight left hand corners. Race tracks in shapes other than ovals are also used for racing, but these tracks are usually designed to have left hand turns while having usually wider right hand turns, such as in FIG. 8 race tracks. The surface of the racing tracks can vary as previously mentioned, and can be made of, for example, dirt, clay, concrete or asphalt for racing go-carts specifically.

In addition, many tracks used banked curves to allow the go-carts to travel at higher speeds. The racing speeds of the motorized racing go carts can reach over 120 mph.

The typical racing go-cart of current manufacture is a relatively simple motorized vehicle large enough to accommodate only one individual, and they consist of the tubular frame alone with a generally single-cylinder engine, without the differential gear and suspensions. Its frame is usually formed from segments of steel tubing rigidly welded together, and the rear axle is connected to this frame by means of rigid bearing hangers. While the frame flexes a limited amount as the go-cart negotiates curves, the amount of flexure is not enough to assure optimum traction, particularly on rough track surfaces. Thus, the go-cart vehicle tends to bounce erratically and slide out on curves. Moreover, as a consequence of the rigid frame construction, engine vibrations are transmitted throughout the entire frame and endanger the welded joints by subjecting them to excessive stresses.

In go-cart vehicles the tubular frame extends in a horizontal plane substantially disposed at the height of the front and rear axles. The seat is placed on the frame at a region included between the axles, and the engine is located behind the seat and before the rear axle.

The accelerator and foot-brake pedals are disposed close to the front axle; the driver can therefore stretch out his legs at least partly towards the front of the vehicle so as to practically discharge the weight of his body exclusively on the seat.

In those go-carts having their centrifugal clutches mounted on the rear axle, the longitudinal frame rails usually pass close to the clutches, and as a result it is practically impossible to service the clutches without disassembling the entire rear end of the go-cart. Indeed, many carts cannot utilize axle clutches without undergoing major frame modifications, and for this reason axle clutches are less popular than engine mounted clutches.

In bends, driving of a go-cart may require side shiftings by the driver so that he can partly transfer the weight of his body towards the inside of the trajectory. Other displacements are not allowed since the driver must always keep his feet on the pedals, while his legs are stretched out. In other words, go-carts are motor-vehicles having the structure which enables the driver to modify his driving position by his own weight only to a very reduced extent.

Moreover, most go-carts of current manufacture are suitable for use with one or two types of engines, but not with a wide variety of engines. The same is also true of clutches.

Unfortunately, recently manufactured go-carts have had major recalls with regard to safety defects associated with these high speed (120 mph+) dual-cylinder engine racing go-carts. These defects have included insufficient braking systems, improper displacement of weight within the go-cart causing flipping of the go-cart, the driver's hair and/or clothing getting caught in wheels and axles, and poorly designed aerodynamic configurations of the cover shell and spoiler that cause unexpected spinouts.

There remains a need for racing go-cart vehicle having improved vehicular features, such as an innovative aerodynamic configuration for better handling and maneuverability by the driver around curves and on the straight-away when driving on the race track; and an electronic shifter with air actuators in which the steering wheel has push-button shifting for safer driving, as the racer always has her/his hands on the steering wheel while shifting. Also, there remains a need for a safer and improved chassis design in order to protect the driver when crashes occur to the vehicle; and for providing an increase in downforce by the chassis for better vehicle handling around banked curves. Additionally, there remains a need for an improved and innovative braking system for instant stopping of the racing vehicle for safe racing, as well as an improved adjustable suspension system for better vehicle handling, steering, turning and vehicle performance, especially around turns.

DESCRIPTION OF THE PRIOR ART

Racing go-carts, small racing vehicles and miniaturized single-seater motor vehicles having various designs, structures, configurations and materials of construction have been disclosed in the prior art. For example, U.S. Pat. Nos. 5,740,878; 5,265,690; 4,896,899; 4,682,668; and 3,799,282 disclose a diverse variety of miniaturized single-seater motor vehicles, go-carts, small racing cars and sports vehicles. None of these aforementioned prior art patents disclose the structure and design of the present invention of a racing go-cart vehicle having such features as an electronic shifter with air actuators, a carbon-fiber chassis, a steering wheel with push-button shifting, four wheel disc brakes with a bias control system, or a KEVLAR™ body-shell cover.

Additionally, U.S. Pat. Nos. 5,375,863; RE34,064; and 5,068,583 disclose mechanical prior art patents on an electronic steering mode shifter, an electric shift apparatus, and an electronic shifter device, respectively. However, none of these aforementioned prior art patents disclose the structure of the present invention of an electronic shifter with air actuators.

These prior art patents do not disclose or teach the structure and design of a high performance and safe racing go-cart vehicle having the aforementioned vehicular features in regard to the overall design, structure and configuration of the present invention.

Accordingly, it is an object of the present invention to provide a racing go-cart vehicle that allows for increased user safety when in operation by the driver; and for longer durability of the go-cart vehicle and its component parts in order to lower maintenance costs, replacement parts costs, and repair labor costs.

Another object of the present invention is to provide a racing go-cart vehicle that allows for an innovative aerodynamic configuration which includes a cover shell design that keeps the vehicle force downward and breaks the wind for faster vehicular speeds in the range of 125 to 130 mph; an adjustable front spoiler and a rear double spoiler for better handling and maneuverability by the driver around curves and on the straight-away when driving on the race track.

Another object of the present invention is to provide a racing go-cart vehicle that includes recessed rear wheel hubs and an improved body shell cover design that prevents the entanglement of hair and/or clothing to the driver while racing in order to deter possible injury or death to the driver.

Another object of the present invention is to provide a racing go-cart vehicle that allows for an electronic shifter with air actuators in which the steering wheel has push-button shifting for safer driving, such that the driver has his/her hands always on the steering wheel and the driver concentrates on driving in the race only. Additionally, the electronic shifter with air actuators of the present invention would have less mechanical failure than that of prior art electronic shifters; and would provide better performance and faster shifting.

Another object of the present invention is to provide a racing go-cart vehicle that has a steering wheel with push-button shifting that includes a shifter with six (6) forward speeds having three (3) buttons, such that a first button is used for down-shifting, a second button is used for up-shifting, and a third button is used for an electric starter.

Another object of the present invention is to provide a racing go-cart vehicle that allows for a safer and improved chassis design in order to protect the driver when a crash occurs to the vehicle; and for providing an increase in downforce by the chassis for better vehicle handling around banked curves. Additionally, the chassis is made of a special carbon-fiber design; such that the vehicular construction is much firmer and more rigid and stronger in case of impact with another racing vehicle.

Another object of the present invention is to provide a racing go-cart vehicle that allows for a KEVLAR™ body-shell cover for better aerodynamics; the shell is more durable and protects that driver on impacts or crashes, such that the shell will crack or tear only depending upon the total force of impact and will not splinter, as opposed to prior art plastic body-shell covers that would splinter on impact.

Another object of the present invention is to provide a racing go-cart vehicle that allows for an improved and innovative braking system that includes four wheel disc brakes with bias control between front and rear brakes for instant stopping of the racing vehicle for safe racing; wherein the bias control has an equalizer control assembly for more braking towards the front brakes or towards the rear brakes for better braking control and handling of the racing vehicle during operation.

Another object of the present invention is to provide a racing go-cart vehicle that allows for an improved adjustable suspension system wherein the front wheels each have a front wheel hub with adjustable suspension A-frames that permits the driver/mechanic to adjust for castor and camber of the racing vehicle for better handling, steering and vehicle performance, especially around turns.

Another object of the present invention is to provide a racing go-cart vehicle that includes a roll bar made out of a special steel alloy 4130 for protecting the driver if the race vehicle rolls over in a crash; and wherein the roll bar also acts as an air tank or air canister for containing air therein for the air actuators of the electronic shifter.

Another object of the present invention is to provide a racing go-cart vehicle that includes a water cooled 125 cc 40 hp motor wherein the water keeps the engine cooler, therefore the engine lasts longer for speeds at 125 mph or higher.

Another object of the present invention is to provide a racing go-cart vehicle that allows for racing wheels which will not interlock with other racing vehicles, and these racing wheels also include an improved design of king pins for use in the adjustable suspension assembly.

Another object of the present invention is to provide a racing go-cart vehicle that includes an air compressor attached to the vehicle chassis, such that the air compressor is actuated when the vehicle is moving (air compressor is connected to the rear axle) and the compressor pumps air into the roll bar for use in the air actuators of the electronic shifter.

Another object of the present invention is to provide a racing go-cart vehicle that includes an electric starter and wherein the steering wheel has a third push-button for electrically starting the racing go-cart vehicle after a spin out, a stall-out or for a normal start-up in operational use.

A further object of the present invention is to provide a racing go-cart vehicle that can be mass produced in an automated and economical manner and is readily affordable by the user or race track owners.

SUMMARY OF THE INVENTION

In accordance with the present invention, there is provided a driver operated racing go-cart vehicle. The racing go-cart vehicle includes a chassis having a top surface, a bottom surface, and front, rear and mid portions; a pair of steerable front wheels and a pair of rear wheels having at least one drive wheel and supporting the chassis; and a body-shell cover attached to the chassis. The racing go-cart vehicle also includes a steering wheel having buttons thereon for push-button shifting; a tie rod operatively connected to the front wheels; a steering column connecting the steering wheel and the tie rod; and a universal joint assembly for articulating the steering column. The racing go-cart vehicle further includes a braking system having a bias control member and an equalizer control assembly attached to the front and rear wheels; the wheels each having an adjustable suspension assembly connected thereto; an engine mounted on the mid portion of the chassis; a transmission system assembly adapted to transfer the output of the engine to the rear drive wheels. Additionally, the racing go-cart vehicle further includes a gas pedal for regulating the speed of the engine; a brake pedal for actuating the braking system for stopping the vehicle; and a single adjustable seat for supporting a driver of the vehicle.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein:

FIG. 4A is a partial cross-sectional view of the racing go-cart vehicle of the present invention taken along lines 4A—4A of FIG. 2 showing the motor mount interior structure of the carbon-fiber chassis matrix;

FIG. 4B is a partial cross-sectional view of the racing go-cart vehicle of the present invention taken along lines 4B—4B of FIG. 2 showing the threaded mounting insert within the mounting opening of the interior structure of the carbon-fiber chassis matrix, and the threaded bolt;

FIG. 7 is a front perspective view of the racing go-cart vehicle of the present invention showing the adjustable suspension assemblies;

DETAILED DESCRIPTION OF THE PREFERRED EMBODIMENT

Figure 1:
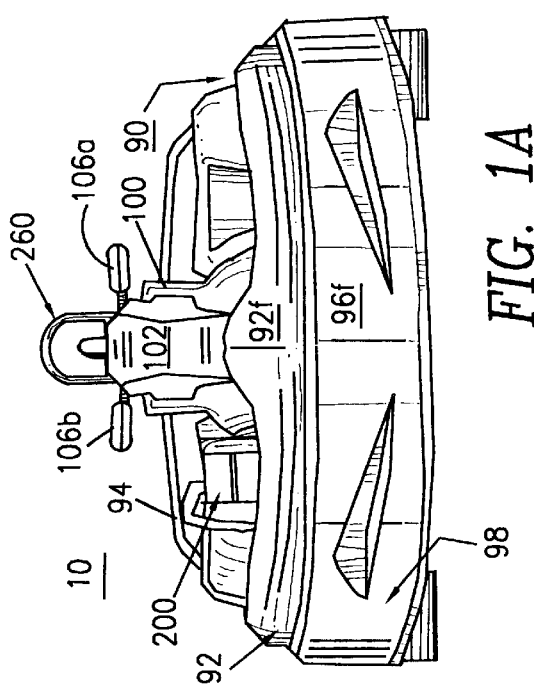
FIG. 1 is a front perspective view of the racing go-cart vehicle of the preferred embodiment of the present invention showing the major component parts contained thereon.
Figure 1A:
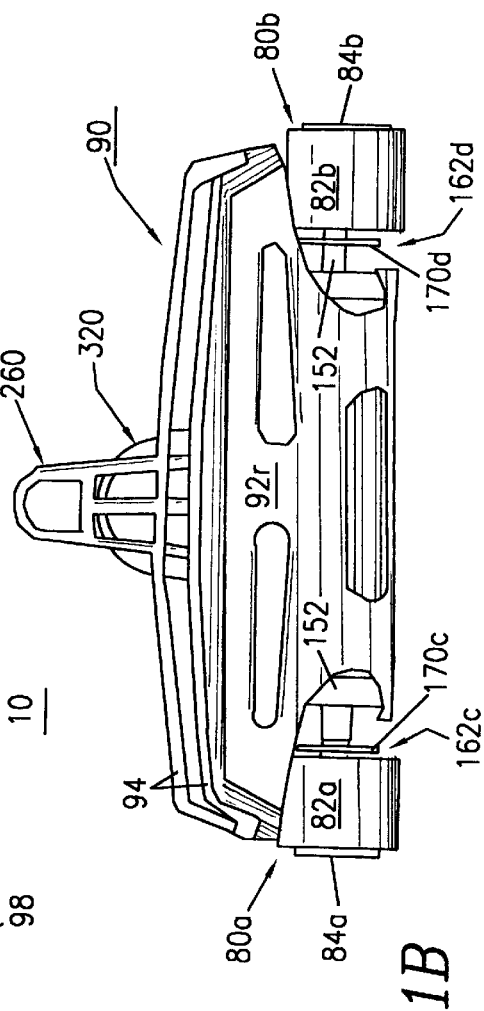
FIG. 1A is a front elevational view of the racing go-cart vehicle of the present invention showing the body-shell cover having a front adjustable spoiler (splitter) and a wind deflector.

The racing go-cart vehicle 10 and its component parts of the preferred embodiment of the present invention are represented in detail by FIGS. 1 through 12 of the drawings. The racing go-cart vehicle 10 includes a chassis frame 20; front and rear wheel members 70a, 70b, 80a and 80b, respectively; a molded body-shell cover 90; a steering wheel 110 having an electronic shifter assembly 240 therein for push-button shifting; a tie rod assembly 130; and a steering column assembly 140. The racing go-cart vehicle 10 further includes a rear axle assembly 150; a braking system 160 having a bias control member 164 with an equalizer control assembly 166; an engine assembly 200; an adjustable suspension assembly 280; and a fuel assembly 300. The racing go-cart vehicle 10 also includes an adjustable single seat assembly 320; and a power source 340.

Figure 1E:
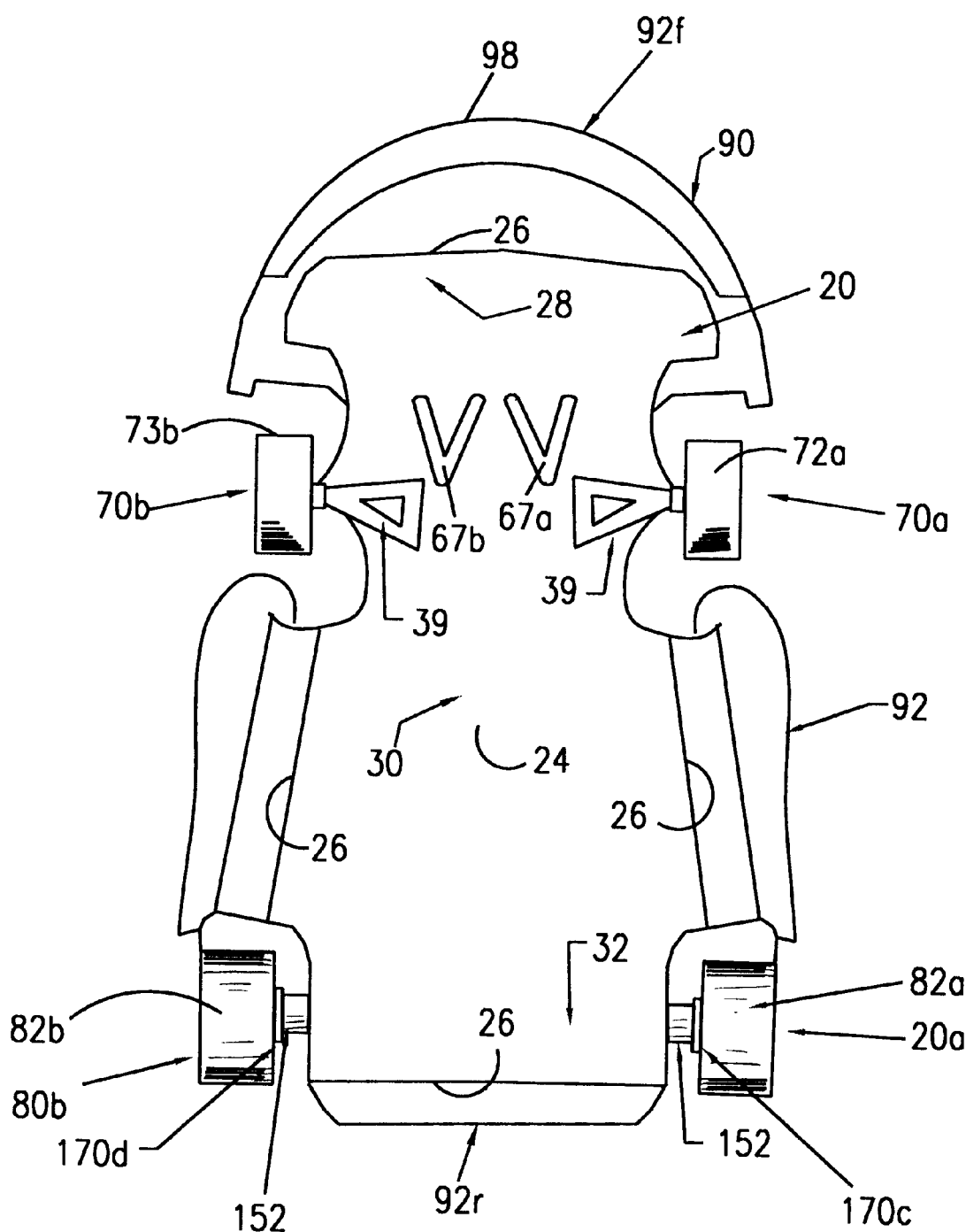
FIG. 1E is a bottom plan view of the racing go-cart vehicle of the present invention showing the chassis frame, front and rear wheel members; and the rear axle assembly.
Figure 2:
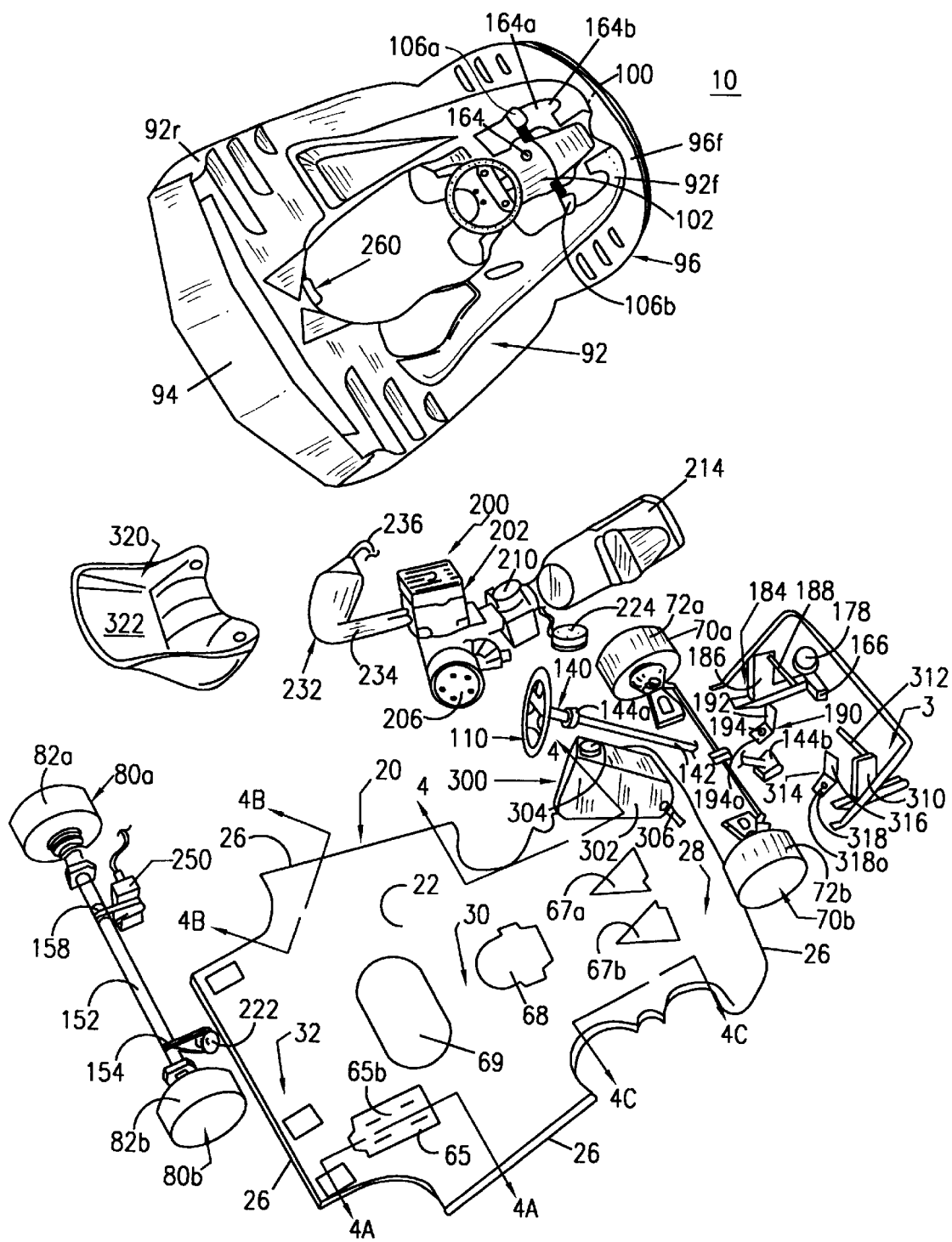
FIG. 2 is an exploded perspective view of the racing go-cart vehicle of the present invention showing the major component parts contained therein.
Figure 4:
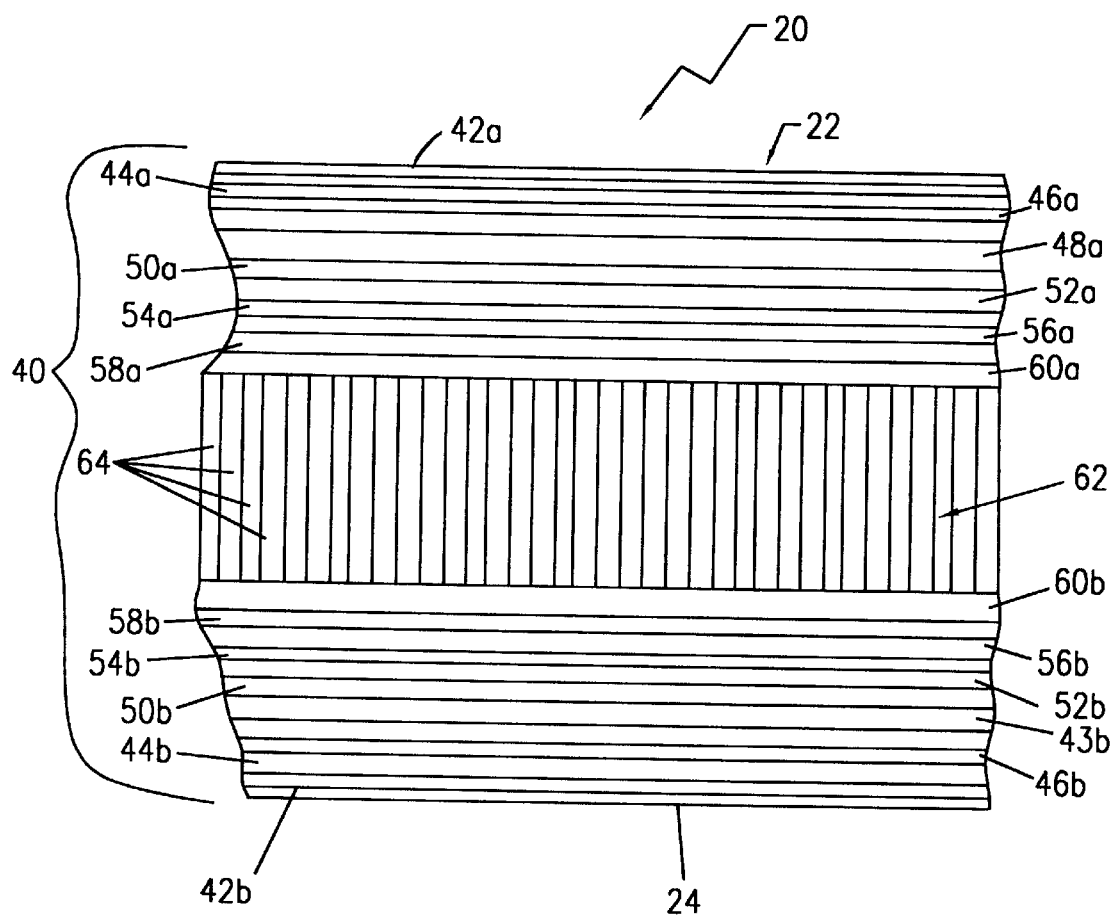
FIG. 4 is a partial cross-sectional view of the racing go-cart vehicle of the present invention taken along lines 4—4 of FIG. 2 showing the interior structure of the carbon fiber chassis matrix.
Figure 4C:
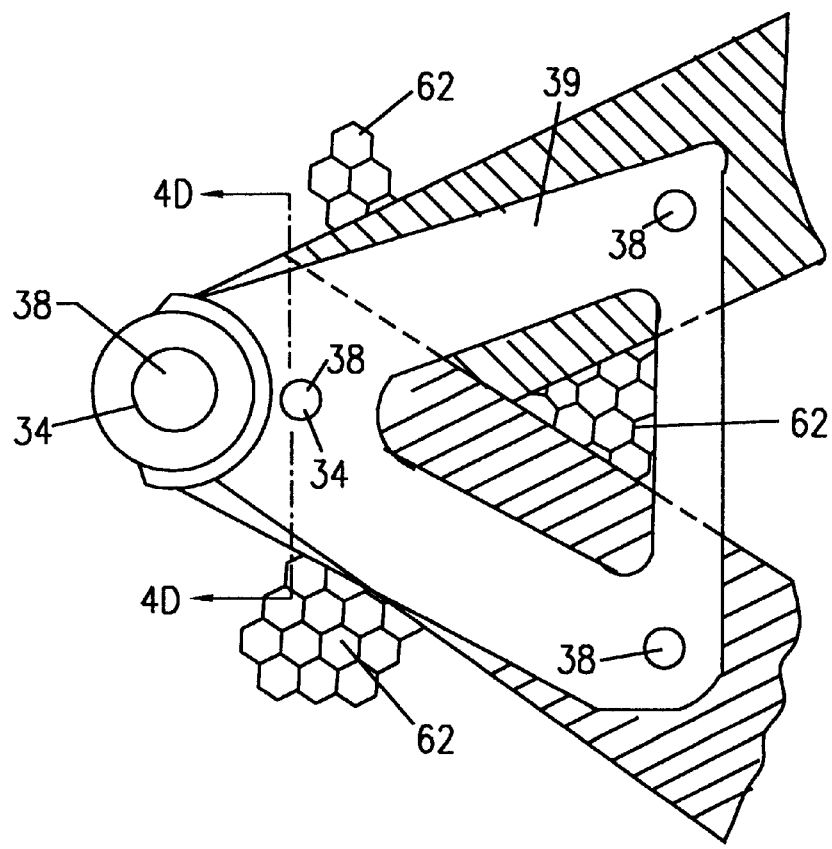
FIG. 4C is a partial top-sectional view of the racing go-cart vehicle of the present invention taken along lines 4C—4C of FIG. 2 showing the carbon fiber, the carbon fiber support, the phenolic resin layer and the honeycomb NOMEXT™ layer of the interior structure of the carbon-fiber chassis matrix.
Figure 4D:
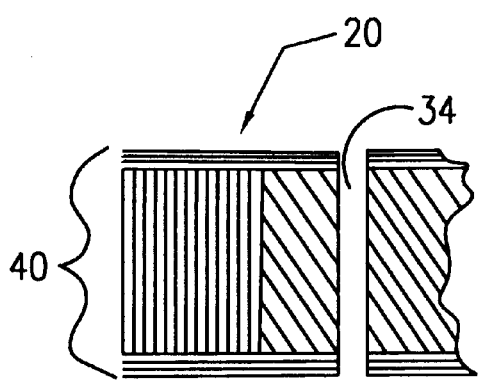
FIG. 4D is a partial cross-sectional view of the racing go-cart vehicle of the present invention taken along lines 4D—4D of FIG. 4C showing the carbon fiber matrix and the opening for the threaded mounted insert.

Chassis 20, as shown in FIGS. 2 and 4 of the drawings, includes a top surface 22, a bottom surface 24, a peripheral side edge 26; and a front portion 28, a middle portion 30, and a rear portion 32. Chassis 20 further includes a plurality of mounting openings 34 drilled through the matrix structure 40 of the chassis 20. Each of the mounting openings 34 includes a threaded mounting insert 36 therein, as shown in FIG. 4B, for receiving a threaded bolt 38 therein in order to attach to the chassis 20 major component parts, such as the body-shell cover 90, the steering column assembly 140, the rear axle assembly 150, the engine 200 and the single adjustable seat assembly 320. The mounting openings 34 are located at predetermined locations for the aforementioned major component parts 90, 140, 150, 200, and 320 along the front, middle and rear portions 28, 30 and 32 of chassis frame 20 accordingly, as shown in FIGS. 1E and 2 of the drawings. Additionally, the top surface 22 of chassis 20 also includes a pair of semi-spherical motor mounts 66a and 66b being integrally connected to the top surface 22 of matrix structure 40, as depicted in FIGS. 4A of the drawings.

Top surface 22 of chassis frame 20, as shown in FIG. 2 of the drawings, further includes a pair of triangle-shaped recesses 67a and 67b for placement of the driver's heels in conjunction with heel plates 190 and 314, respectively; a center recess indentation 68 for placement of the plastic gas tank 302 of fuel assembly 300 within the center recess indentation 68; and an oval recess 69 for placement of the seat member 322 within the oval recess indentation 69. The triangle-shaped recesses 67a and 67b are located in the front portion 28 of the chassis frame 20; the center recess indentation is located in the middle portion 30 of chassis frame 20; and the oval recess indentation 69 is positioned in the rear portion 32 of chassis frame 20. Additionally, top surface 22 of chassis frame 20 also includes a rectangular-shaped indentation 65 having a metal base 65b for the placement, mounting and holding of the engine 202 thereon. The rectangular-shaped protrusion 65 is located in the rear portion 32 of chassis frame 20.

The bottom surface 24 of chassis frame 20, as shown in FIGURE of the drawings, further includes a pair of metal structural supports 39 for holding and mounting of the adjustable suspension assemblies 280a and 280b. The metal structural supports 39 are located on the front portion 28 of chassis frame 20. The metal structural supports 39 are triangular in shape and are made of aluminum.

As shown in FIG. 4, a plurality of material layers are bonded together under pressure to form the matrix structure 40 of chassis 20. The chassis 20 is made from carbon fiber materials bonded together in order to produce a chassis design that is much firmer and more rigid and stronger in case of impact or crash with another racing vehicle(s) or racing wall, etc. This chassis frame design replaces the prior chassis designs that are tubular in structure.

The matrix structure 40 of chassis 20, as shown in FIGS. 4, 4A, 4B and 4C of the drawings, includes a series of outer layers 42a and 42b, a series of inner layers 44a, 44b, 46a, 46b, 48a, 48b, 50a, 50b, 52a, 52b, 54a, 54b, 56a, 56b, 58a, 58b, 60a and 60b and a core layer 62 and 64. The outer layers 42a and 42b are made of carbon fiber twill. The first inner layers 44a and 44b, the fourth inner layers 50a and 50b and the seventh inner layers are made of No. 3 carbon fiber supports, as shown in FIG. 4 of the drawings. The second inner layers 46a and 46b, the fifth inner layers 52a and 52b, an the eight inner layers 58a and 56 are made of No. 2 unidirectional carbon fiber. The third inner layers 48a and 48b are made of fiber glass tissue. The sixth inner layers 54a and 54b are made of carbon fiber tissue rotated at a 90° angle with respect the fifth and seventh inner layers 52a, 52b, 56a and 56b, respectively. The ninth inner layers 60a and 60b are made of an adhesive structural support film for bonding with the eight inner layers 58a and 58b and the inner core layers 62 and 64. The inner core layer 62 is made of a honeycomb NOMEX™ material being infused with a phenolic resin material 64, as depicted in FIG. 4 of the drawings. As previously indicated, the aforementioned layers are molded and bonded together under pressure to form matrix structure 40 of chassis 20.

Figure 1B:
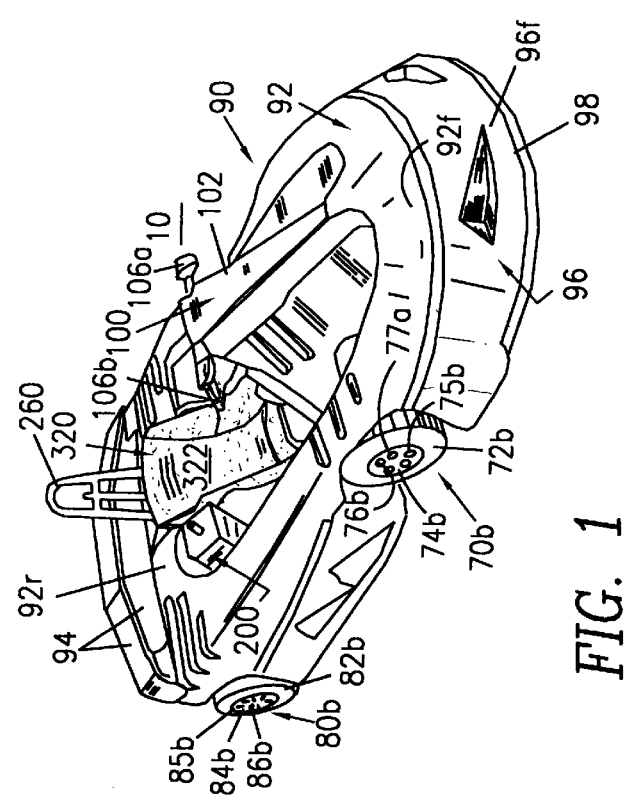
FIG. 1B is a rear elevational view of the racing go-cart vehicle of the present invention showing the body-shell cover having a rear double spoiler thereon.
Figure 1C:
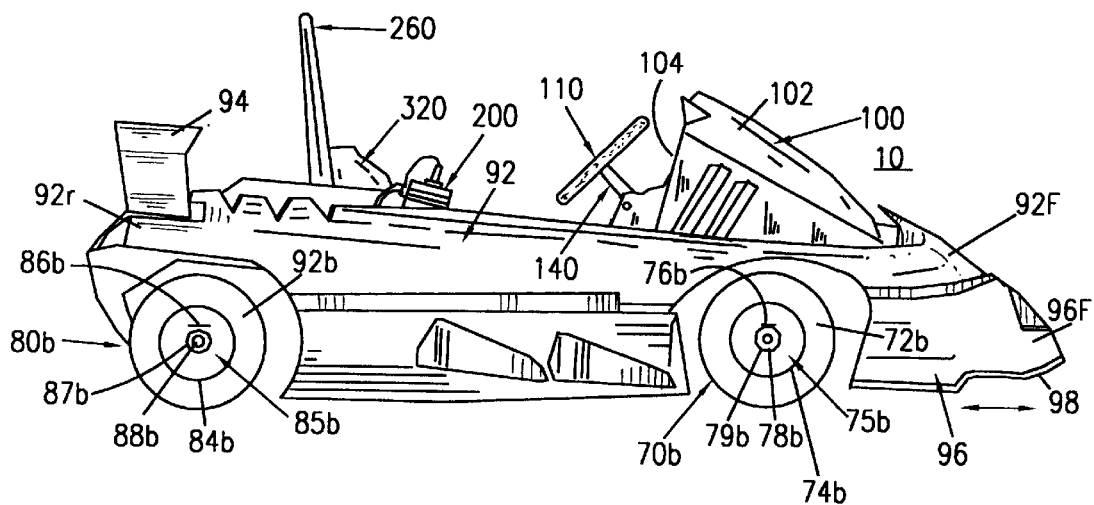
FIG. 1C is a side elevational view of the racing go-cart vehicle of the present invention showing the body-shell cover, front and rear wheels, the roll bar and the steering wheel.

The front wheel members 70a and 70b, as shown in FIGS. 1, 1C and 2 of the drawings, each respectively including a front rubber tire 72a and 72b, a front aluminum or steel rim 74a and 74b having a cavity section 75a and 75b therein with an air valve stem 76a and 76b attached thereto, a wheel retainer plate 77a and 77b and a hub retaining nut 78a and 78b for attaching to each attaching end 171a and 171b of the spacer hub-spindle sub-assembly 172a and 172b, respectively.

The rear wheel members 80a and 80b, as shown in FIGS. 1, 1B, 1C and 2 of the drawings, each respectively including a rear rubber tire 82a and 82b, a rear aluminum or steel rim 84a and 84b having a cavity section 85a and 85b therein with an air valve stem 86a and 86b attached thereto, a wheel retainer plate 87a and 87b and a hub retaining nut 88a and 88b for attaching to each attaching end 152l and 152r of the rear axle member 152.

Figure 1D:
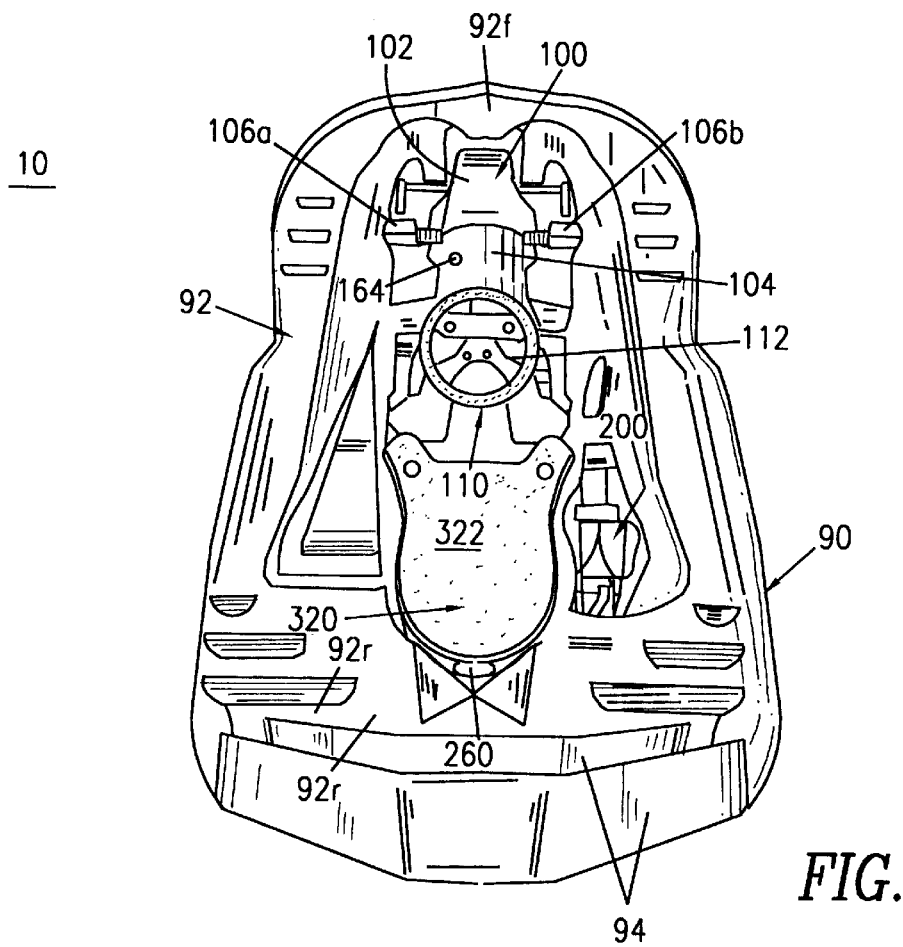
FIG. 1D is a top plan view of the racing go-cart vehicle of the present invention showing the body-shell cover, the engine assembly, the steering wheel, and the single adjustable seat.

The molded body-shell cover assembly 90, as shown in FIGS. 1, 1D and 2 of the drawings, includes an exterior outer body-shell section 92, an exterior front-end section 96, and a wind deflector section 100. The exterior outer body-shell section 92 includes a front end 92f, a rear end 92r and a peripheral mounting edge 92m having a plurality of mounting openings 92o therein for mounting the exterior-outer body-shell section 92 to the chassis frame 20 thereon. A rear double spoiler 94 is connected to the rear end 92r of the exterior outer body-shell cover 92, as shown in FIGS. 1, 1B and 1D of the drawings. The exterior front-end section 96 includes a lower front-end portion 96f having an adjustable front spoiler/front splitter 98 attached thereon. The wind deflector section 100 includes a front wind deflector portion 102, a rear vertical dash-board portion 104 having a pair of side-view mirror members 106a and 106b attached thereon, and peripheral mounting edges 100m having mounting openings 100n therein for mounting the wind deflector section 100 to the chassis frame thereon.

The rear double spoiler 94 is used for keeping the rear end 92r of vehicle 10 downward when in operational use for better vehicle handling and maneuverability around banked curves. The adjustable front spoiler/splitter 98 is adjusted forward or rearward along the top surface 22 of the front portion 28 of chassis frame 20 and is used for keeping the front-end portion 92f of vehicle 10 downward when in operational use for better vehicle handling and maneuverability by the driver around banked curves and on the straight-away when driving vehicle 10 on the race track.

The overall aerodynamic configuration of the body-shell cover sub-assemblies 92, 96 and 100 of the body-shell cover assembly 90 provides an innovative cover shell design that keeps that vehicle force downward and breaks the wind for faster vehicular speeds in the range of 125 to 130 mph.

The molded body-shell cover assembly 90 components are made from KEVLAR™, such that the cover sub-assemblies 92, 96 and 100 are durable, strong, and shatter/splinter-proof. The body-shell cover sub-assemblies 92, 96 and 100 of body-shell cover assembly 90 will only crack or tear depending upon the total force of impact and will not splinter, as opposed to prior manufactured go-cart body-shell covers that would splinter or shatter upon an impact or crash of the go-cart vehicle.

Steering wheel assembly 110, as shown in FIGS. 1, 1D, 2 and 3 of the drawings, includes a circular-shaped steering wheel member 112 having a center mount section 114 for connecting to the steering column 140 and having an upper steering wheel mount plate 116 attached thereon. Mount plate 116 includes two diamond-shaped recesses 118 and 120 for receiving therein a first push-button 122 and a second push-button 124, respectively. The first and second push-buttons 122 and 124 are positioned on opposite ends 116a and 116b of mount plate 116, respectively. The first push-button 122 is used for the down-shifting control of the electronic shifter assembly 120; and the second push-button 124 is used for the up-shifting control of the electronic shifter assembly 120. The center mount section 114 includes a circular opening 126 for receiving therein a third push-button 128 for use with the electric starter 216 in starting-up engine 202.

Figure 8:
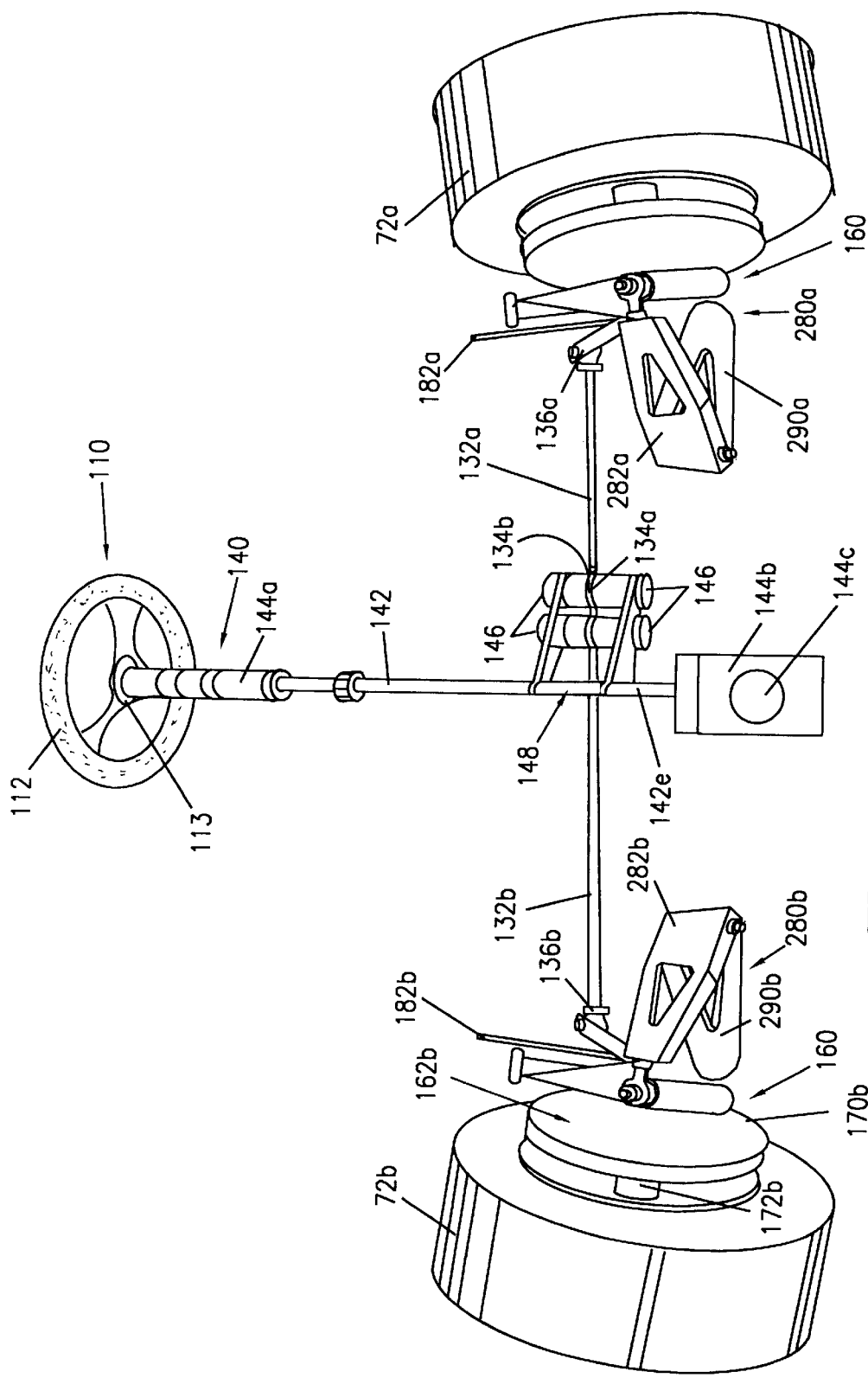
FIG. 8 is a front perspective view of the racing go-cart vehicle of the present invention showing a front wheel brake assembly having bias control therein of the braking system assembly, the tie rod assembly and the steering column assembly.

The tie rod assembly 130, as shown in FIG. 2 and 8 of the drawings, includes first and second tie rod steering arms 132a and 132b each having inner connecting end members 134a and 134b for connecting to the ackerman steering member (steering connector plate) 148 of steering column 140 for the tie rod steering arms 132a and 132b; and each having outer connector mounting end members 136a and 136b for connecting to the front up-right sub-assembly 292a and 292b of the adjustable suspension assembly 280, respectively.

Figure 3:
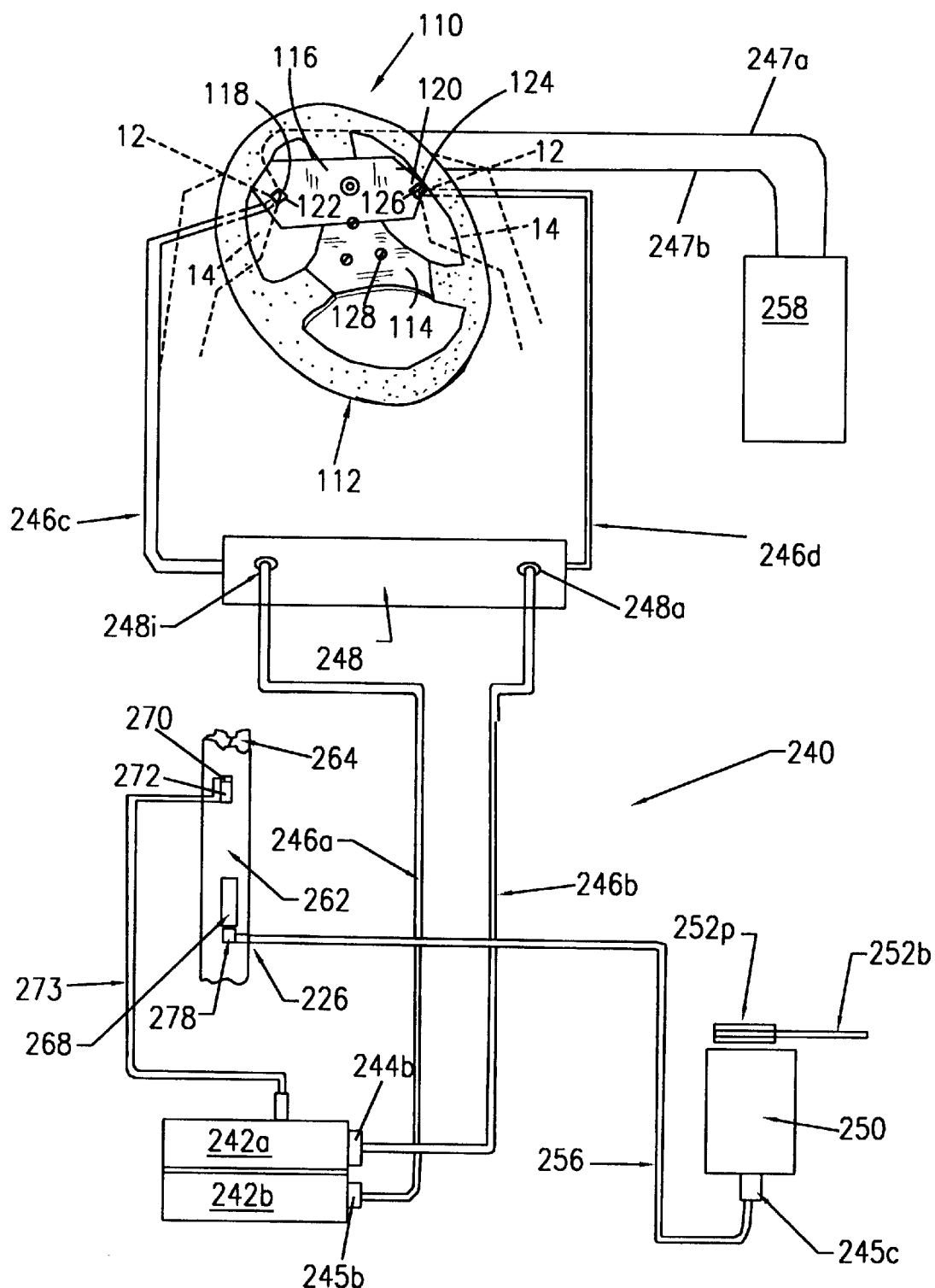
FIG. 3 is a front perspective view of the racing go-cart vehicle of the present invention showing the steering wheel with push-button shifting, and the electronic shifter assembly with air actuators.

The steering column assembly 140, as shown in FIGS. 2, 3 and 8 of the drawings, includes a steering column member 142 having an upper steering column bearing member 144a and having a lower steering column bearing member 144b with an integrally connected mounting plate 144c having mounting opening 144o for bolts 146 for connecting and attaching to the front portion 28 of chassis frame 20; and an integrally attached ackerman steering member 148 positioned at the lower end 142e of steering column member 142. As previously mentioned, the steering member 148 connects to each of tie rod steering arms 132a and 132b, respectively. The upper steering column bearing 144a is connected to the center mount section 113 of steering wheel member 112, as shown in FIGS. 3 and 8 of the drawings. The ackerman steering member 148 is the universal joint means for articulating the movement of the steering column member 142.

Figure 11:
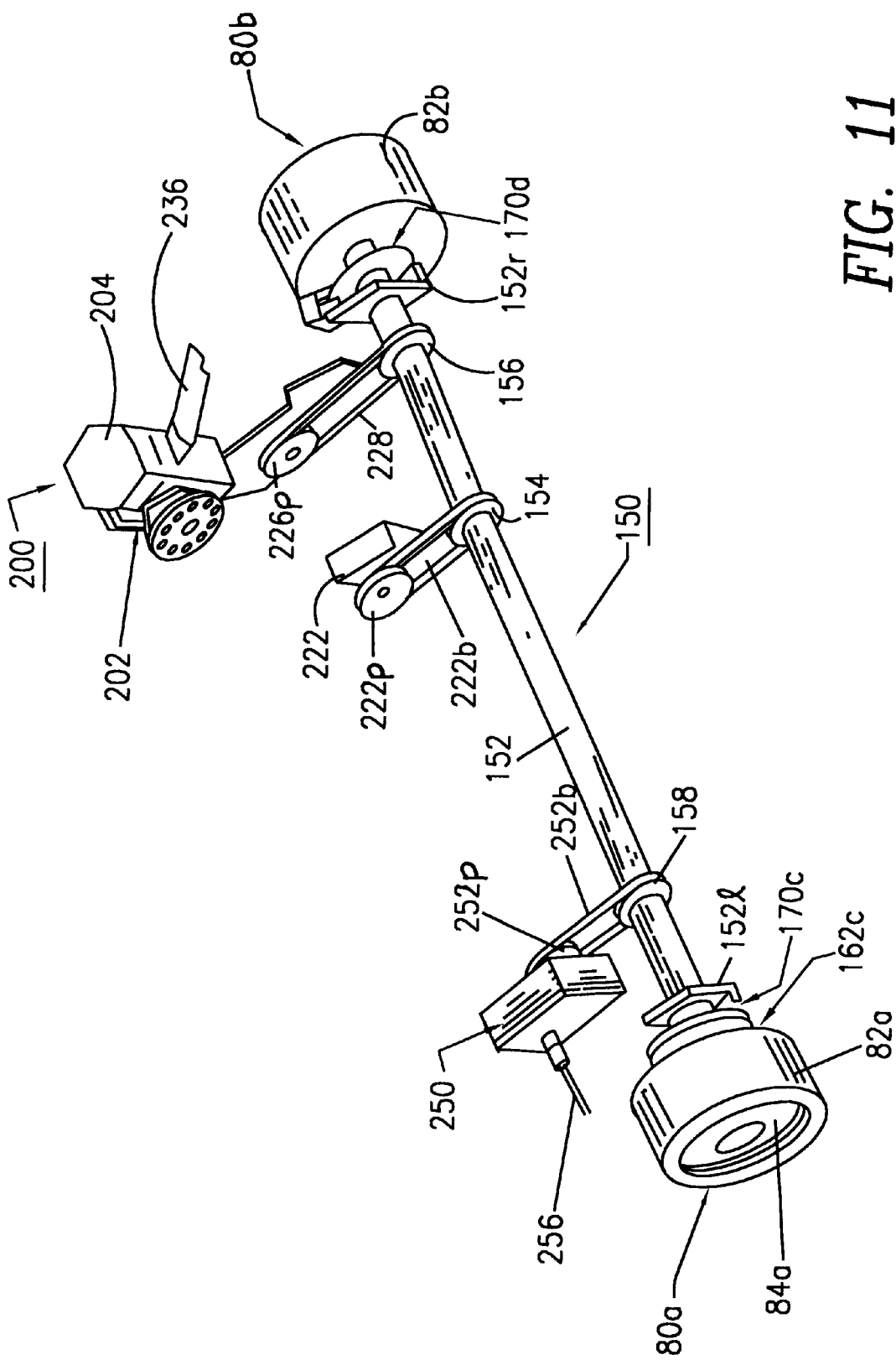
FIG. 11 is a front perspective view of the racing go-cart vehicle of the present invention showing the air compressor and its connection to the rear axle of the racing go-cart vehicle.

The rear axle assembly 150, as shown in FIGS. 1E, 2, and 11 of the drawings, includes a rear axle member 152 having first and second attaching ends 152l and 152r, a water pump axle collar pulley 154, a drive-train axle collar pulley 156, and an air compressor axle collar pulley 158. Collar pulleys 154, 156 and 158 are connected to pre-determined locations along the length of the rear axle member 152, as shown in FIG. 11 of the drawings.

The braking system 160, as shown in FIGS. 2, 8 and 11 of the drawings, include front and rear disc brake assembly 162a, 162b, 162c and 162d having a bias control knob member 164 with an equalizer control sub-assembly 166. Each of the front disc brakes 162a and 162b includes a front brake caliper 168a and 168b, a front brake rotor sub-assembly 170a and 170b and a front wheel spacer hub and spindle sub-assembly 172a and 172b. Each of the rear disc brakes 162c and 162d includes a rear brake caliper 168c and 168d, a rear brake rotor sub-assembly 170c and 170d, a rear wheel hub sub-assembly 174a and 174b, and a rear wheel bearing sub-assembly 176a and 176b. The bias control knob member 164 includes a pair of bias control cables 164a and 164b for adjusting the braking towards the front brakes 162a and 162b or towards the rear brakes 162c and 162d.

The braking system 160, as shown in FIGS. 2, 8 and 11 of the drawings, further includes a master brake cylinder 178 having front and rear brake cylinders 180a and 180b with brake fluid therein, and having front and rear brake lines 182a and 182b connected to the front and rear brake calipers 168a and 168d, respectively. Brake system 160 also includes a brake pedal sub-assembly 184 attached to the master brake cylinder 178. The brake pedal sub-assembly 184 includes a movable vertical member 186 connected to a horizontal brake pedal rod 188, and an L-shaped heel plate 190 for the driver's left foot and heel. Heel plate 190 includes a vertical heel plate section 192 integrally attached to the horizontal mounting plate 194 having openings 194o for receiving bolts 38 in order to attach the mounting plate 194 of heel plate 190 to the front portion 28 of chassis frame 20.

Engine assembly 200, as shown in FIGS. 1, 2, 5A and 5B of the drawings, includes a reciprocating engine 202 having one cylinder head 204 with a single stroke piston (not shown) therein, a clutch sub-assembly 206, a differential gear sub-assembly 208, a carburetor sub-assembly 210, an ignition coil member 212, an air breather member 214, an electric starter 216, a starter relay 217 and a motor mount plate 218. The differential gear sub-assembly 208 is the transmission means for transferring the output of engine 202 to the rear axle member 152 in order to move the rear drive wheel members 80a and 80b forwardly. The motor mount plate 218 attaches to the top surface 22 of the middle portion area 30 of chassis frame 20 via threaded bolts 38.

Engine assembly 200 further includes a water cooled radiator 220, a water pump 222 having a water pump pulley 222p attached thereto with water pulley bolts 222b attached to pulley 222p and to a water pump axle pulley 142 connected to the rear axle 152, and water lines 222w there connected for transferring water 17 internally to engine 202 when in operational use. Engine assembly also includes a fuel pump 224 having an intake fuel line 224f and an inlet fuel line 224i from gas tank 302 and an air actuator piston 248 attached to the differential gear assembly 208 for use with the electronic shifter assembly 240. Engine assembly 200 additionally includes a drive train sub-assembly 226 having a drive-train motor pulley 226p attached to the differential gear assembly 208, a drive-train chain 228, and a drive-train axle pulley 156 for turning the rear axle member 152; and an exhaust system sub-assembly 232 having an expansion chamber 234 which tunes the exhaust stroke of the exhaust system sub-assembly 232, and a muffler/silencer 236 for quieting the exhaust gases from the exhaust stroke of engine 202. Engine 202 is water cooled via radiator 218; and sized at 125 cc with a 40 hp rating. Engine 202 is capable of speeds in excess of 125 mph or higher. Engine 202 is made from cast aluminum.

Figure 5A:
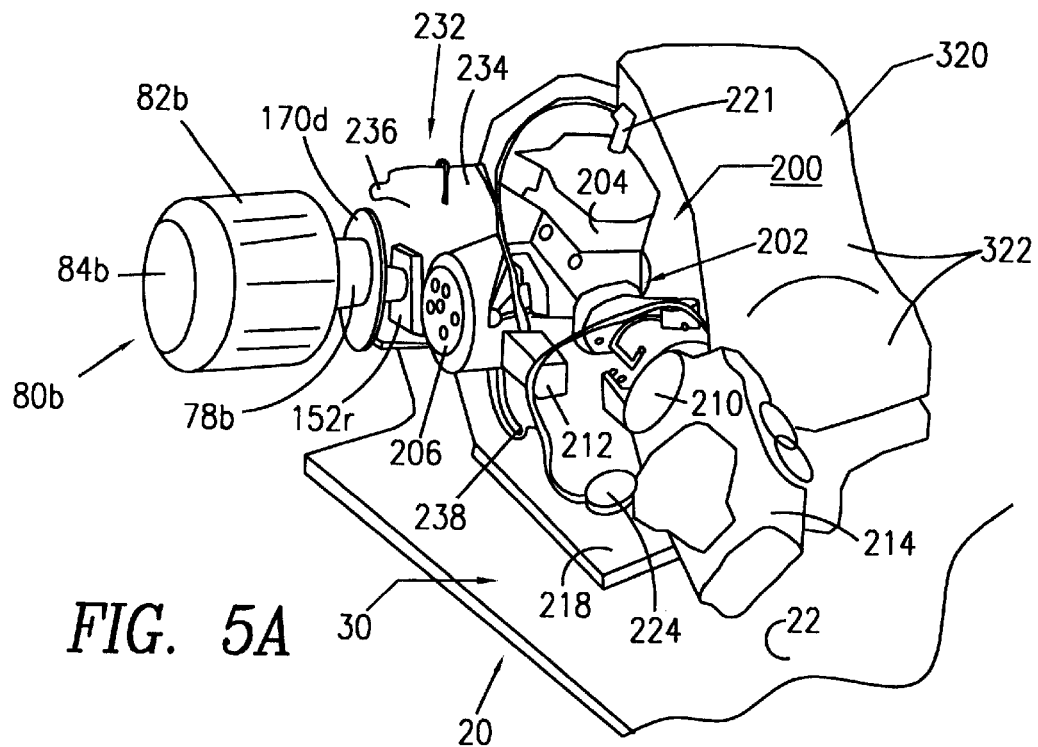
FIG. 5A is a front perspective view of the racing go-cart vehicle of the present invention showing the engine assembly and its major component parts thereon.
Figure 5B:
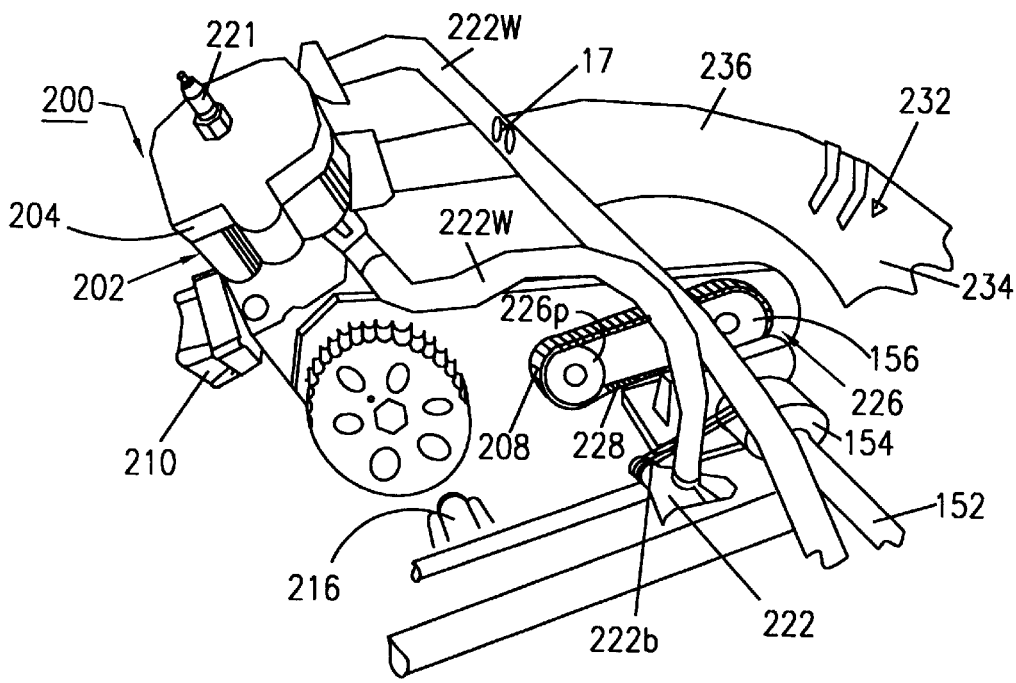
FIG. 5B is a rear perspective view of the racing go-cart vehicle of the present invention showing the engine assembly and its major component parts thereon.
Figure 6:
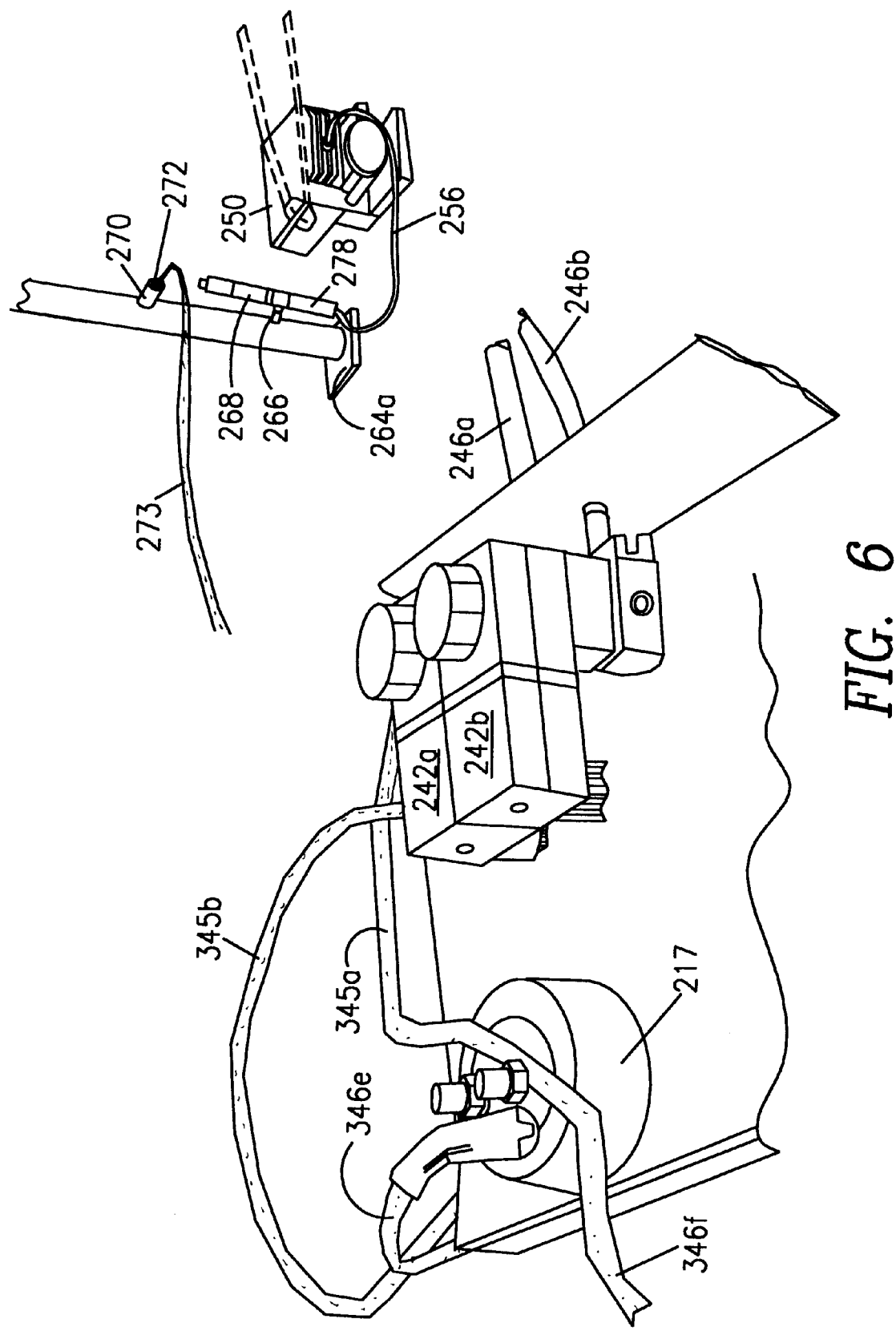
FIG. 6 is a front perspective view of the racing go-cart vehicle of the present invention showing the electronic shifter assembly with air actuators.
Figure 12:
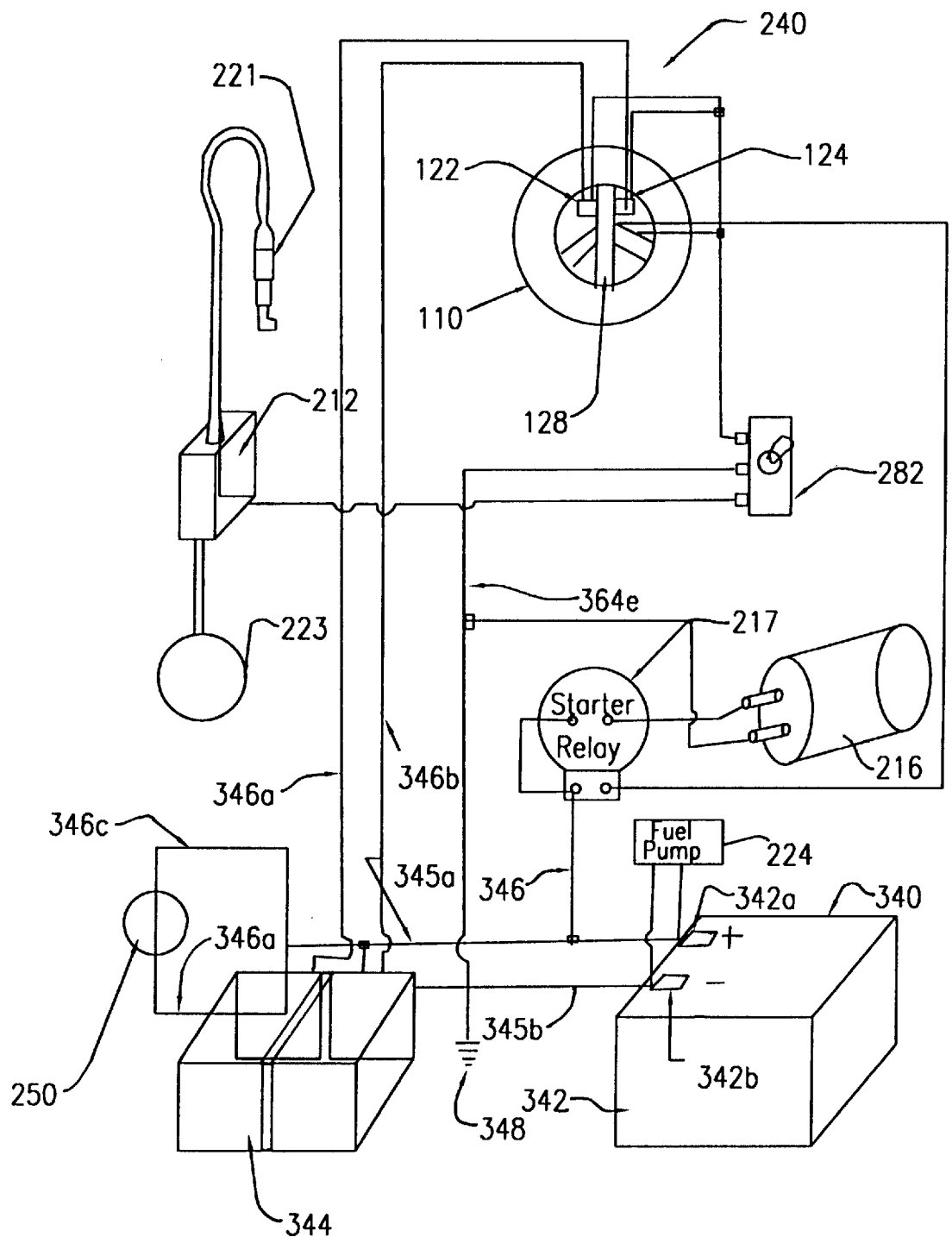
FIG. 12 is an electrical schematic drawing of the racing go-cart vehicle of the present invention showing its electrical connections to the electronic shifter, the electric starter, and the air compressor for the racing go-cart vehicle.

The electronic shifter assembly 240, as shown in FIGS. 3, 6 and 12 of the drawings, includes a pair of electronic actuator control valves 242a and 242b each having air inlet port opening 244i and 245i and each having air outlet port opening 244o and 245o, respectively; a plurality of connecting air lines 246a to 246d; and a pair of electrical wire lines 247a and 247b for connecting to the shifting push-buttons 122 and 124, respectively. The electronic shifter assembly 240 further includes an air actuator piston 248 having inlet and outlet port openings 248i and 248o therein. Air actuator piston 248 is connected to the differential gear sub-assembly 208, as shown in FIG. 5B of the drawings. The electronic shifter assembly 240, as shown in FIG. 3 of the drawings, also includes an air compressor 250 having an air compressor pulley 252p attached thereto; a pulley belt 252b; an air outlet port opening 254 having an outlet port connector member 254c attached thereto with an outlet port air line 256 attached to connector member 254c; and an electrical solenoid member 258. Solenoid member 258 connects to the shifting push-buttons 122 and 124 via the connecting electrical wire lines 247a and 247b, respectively.

Air lines 246a and 246b connect at one end to the air inlet port openings 244i and 245i of the actuator control valves 242a and 242b, respectively; and air lines 246a and 246b connect at the other end to the inlet and outlet port openings 248i and 248o of the air actuator piston 248, respectively. Air lines 246c and 246d connect at one end to the air outlet port openings 244o and 245o of the actuator control valves 242a and 242b, respectively; and air lines 246c and 246d connect at the other end to the electrical solenoid member 258.

Figure 10:
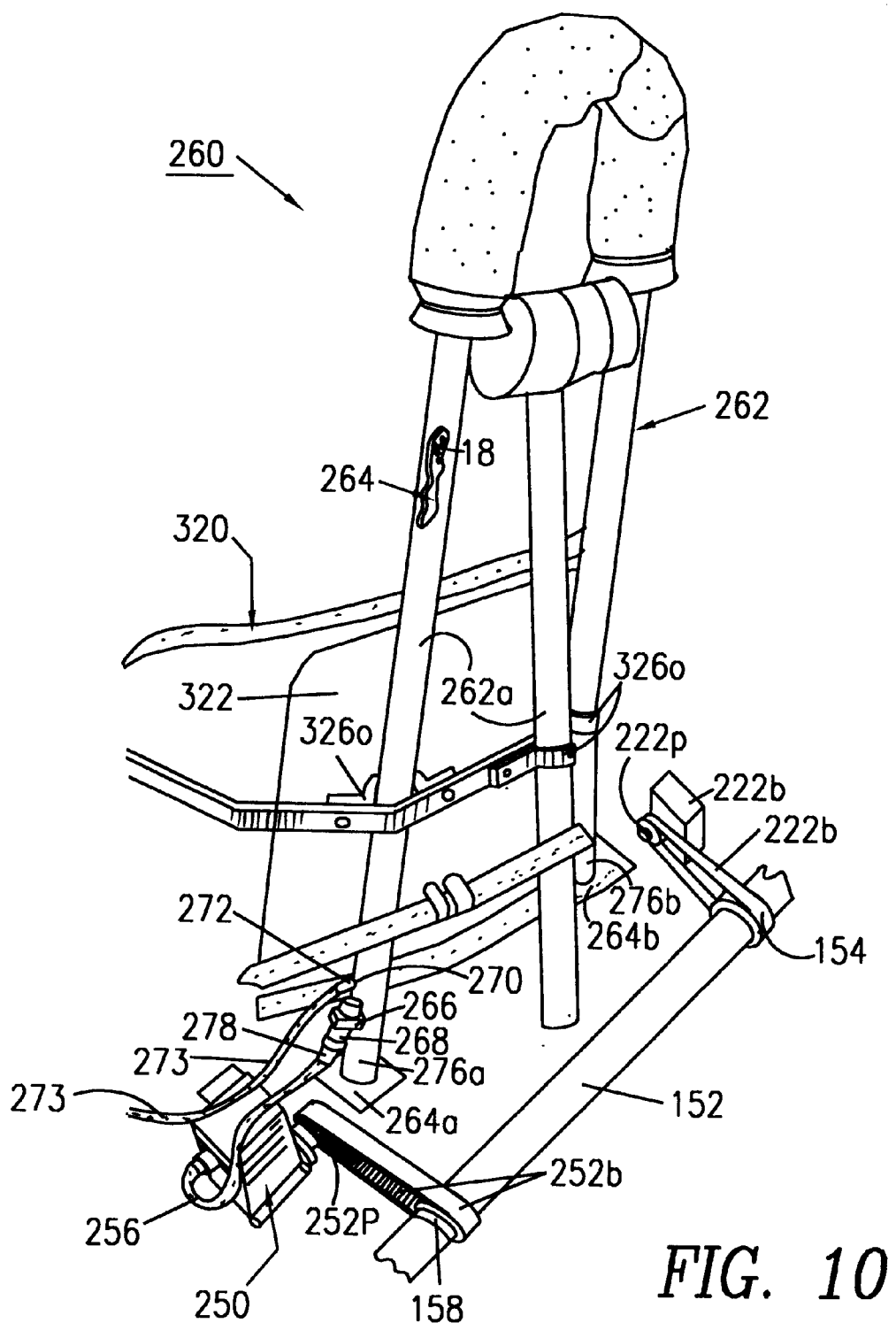
FIG. 10 is a front perspective view of the racing go-cart vehicle of the present invention showing the roll bar and its component parts thereon.

The roll bar 260, as depicted in FIGS. 1, 2 and 10 of the drawings, includes a substantially U-shaped tubular housing 262 having a U-shaped tubular reservoir 264, a first opening 266 for an inlet valve 268, a second opening 270 for an outlet valve 272 and a pair of mounting plates 264a and 264b at each of the ends 276a and 276b of the tubular housing 262 for mounting the roll bar 260 to the chassis 20. Roll bar 260 is located on the rear portion area 32 of the top surface 22 of chassis 20. Roll bar 260 provides a dual function for the racing go-cart vehicle 10, first as a protection device for the driver in the event of a crash and vehicle 10 rolls over and second as an air tank or air reservoir 262 for containing air 18 for use with the air actuator control valves 242a to 242b of the electronic shifter 240. Inlet valve 268 is a one-way valve for receiving air 18 into the tubular housing 262 from the air compressor 250 which is generating the air 18. Inlet valve 268 further includes an attached pressure release valve 278 for relieving excess air pressure within the air reservoir 262. Outlet valve 272 is a one-way valve for relieving the pressurized air 18 from the tubular reservoir 262 for use with air actuator control valves 242a to 242b of the electronic shifter assembly 240. Roll bar 260 is made from a special steel alloy 4130 for strength, durability and resistance to corrosion.

Figure 9:
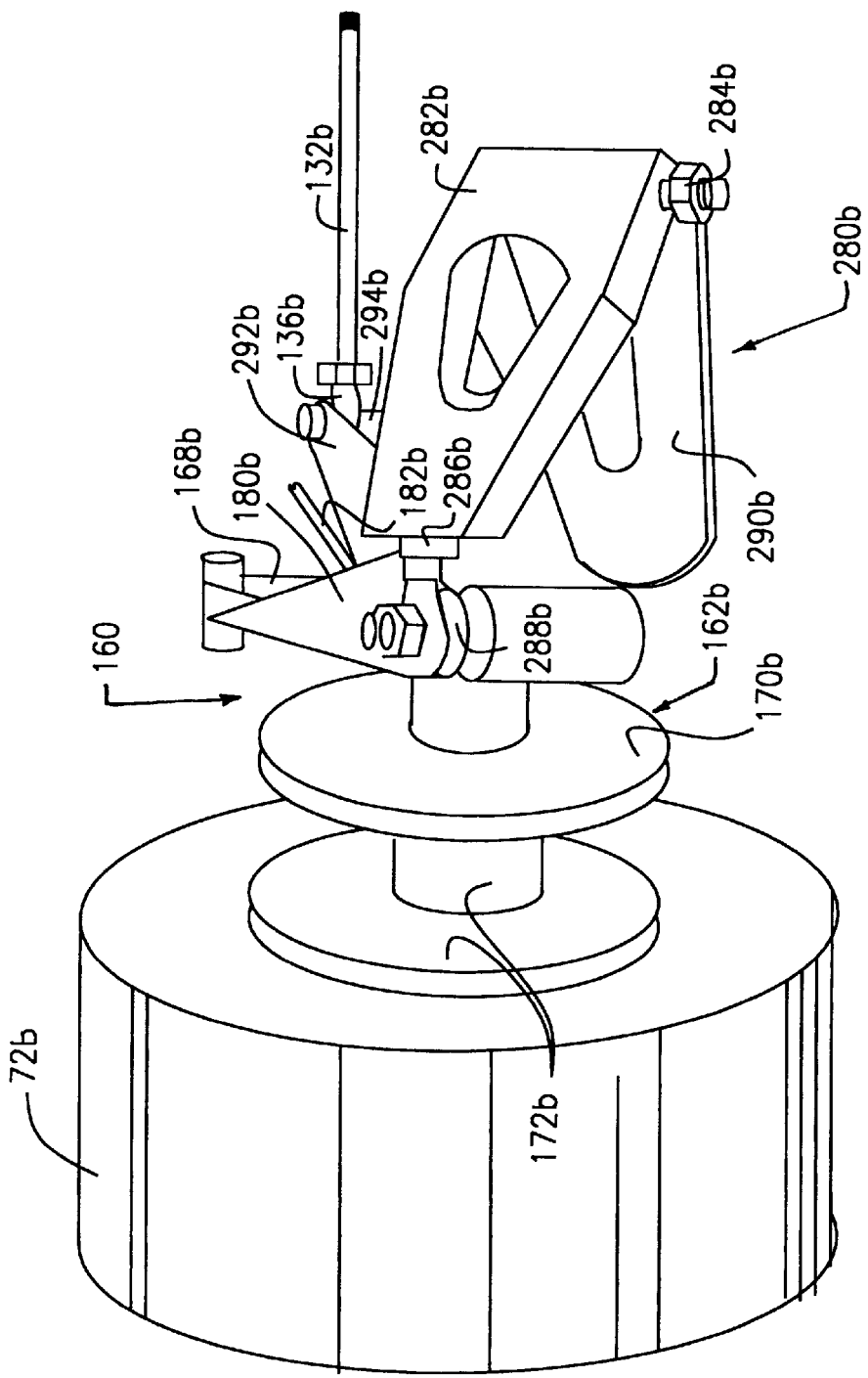
FIG. 9 is a front perspective view of the racing go-cart vehicle of the present invention showing the adjustable suspension system having a front wheel hub with an adjustable suspension A-frame for adjusting the castor and camber of the A-frame.

The adjustable suspension assemblies 280a and 280b, as shown in FIGS. 2, 8 and 9 of the drawings, includes a pair of upper A-frames 282a and 282b each having a first connecting member 284a and 284b and having a second connecting member 286a and 286b thereon, a pair of king pin members 288a and 288b, a pair of lower A-frames 290a and 290b attached to the front portion 28 of the chassis frame 20, and a pair of front wheel up-right sub-assemblies 292a and 292b each having a connector member 294a and 294b for attaching to the inner connecting end members 134a and 134b of the tie rod steering arms 132a and 132b, respectively, of the tie rod assembly 130. Each of the front up-right sub-assemblies 292a and 292b are connected to the front brake rotor sub-assemblies 170a and 170b, respectively, of the braking system 160.

Fuel assembly 300, as shown in FIG. 2 of the drawings, includes a plastic gas tank 302 with cap 304 having gasoline 19 therein, and plastic fuel lines 306 for connecting to the fuel pump 224 of engine assembly 200. Plastic gas tank 302 is located and connected to the top surface 22 and middle portion area 30 of chassis frame 20; and adjacent to the steering column member 142. Fuel assembly 300 further includes a gas pedal accelerator sub-assembly 308 having a movable vertical member 310 connected to a horizontal gas pedal rod 312, and an L-shaped heel plate 314 for the driver's right foot and heel. Heel plate 314 includes a vertical heel plate section 316 integrally attached to the horizontal mounting plate 318 having openings 318o for receiving bolts 38 in order to attach the mounting plate 318 of heel plate 314 to the front portion 28 of chassis frame 20.

The adjustable single-seat assembly 320, as shown in FIGS. 1, 1D, 2 and 10 of the drawings, includes a seat member 322, a peripheral mounting edge 324 having a plurality of mounting openings 324. Therein, and an adjustable seat bracket 326 having adjusting openings 326o therein. The adjustable seat bracket 326 is connected to the upper section 262u of the tubular housing 262 of roll bar 260.

The electrical schematic circuit diagram, as shown in FIG. 12 of the drawings, includes a power source 340, an electrical solenoid member 344 for actuating the shifting push-buttons 122 and 124, an electric starter 214 having an ON/OFF switch 282 and a starter relay 217, an ignition coil member 212 having a spark plug 221 and pickup/magneto 223, a fuel pump 224, and an air compressor 250. Power source 340, as shown in FIGS. 2 and 12 of the drawings, includes a 12V gel-battery 342 having positive and negative posts 342a and 342b respectively. Electrical solenoid member 344 having electrical lines 346a and 346b for electrically connecting to the push-buttons 122 and 124 of the electronic shifter assembly 240. The air compressor 250 having electrical lines 346c and 346d connected to electrical solenoid member 344. The electric starter 216 is connected to the ON/OFF 282 switch via electrical line 346e and electrically connected to the starter relay via electrical line 346f. Electrical line 345a connects to the positive post 342a of battery 342 and to the electrical solenoid member 344. Electrical line 345b connects to the negative post 342b of battery 342 to the grounding member 348. Battery 342 is located and connected to the top surface 22 of the middle portion area 30 of chassis 20; and adjacent to the adjustable seat 320.

OPERATION OF THE PRESENT INVENTION

In operation of the racing go-cart vehicle 10 of the present invention by a driver operator, the operational description of the workings of key assemblies and sub-assemblies will only be described, as the driving of motorized racing vehicles is well known.

In currently manufactured go-cart vehicles, the start-up of the vehicle is achieved by the pulling of a start cord (akin to starting-up a powered lawn mower) to achieve ignition and firing up of the engine or by manually pushing the vehicle and releasing the clutch to start-up the engine. The present invention eliminates the aforementioned procedures by having an ignition ON/OFF switch 230 on the dash board panel 104 and an electric start-up button 128 on the steering wheel member 112 for turning ON the electric starter 216. The driver simply switches ON the ignition ON/OFF switch 230 and depresses the electric start-up push-button 128 which in turn fires up the engine 202 and vehicle 10 is ready to drive.

In currently manufactured go-cart vehicles, the driver operator has to use a clutch pedal and a clutch shifter column for changing gears in order for the vehicle to move in a forward direction (i.e. first through sixth forward speed gears); such that the driver is constantly using his left foot and right hand to down-shift and/or up-shift the forward speeds of the vehicle while racing the go-cart vehicle on a race track. The present invention eliminates the aforementioned procedures by having push-buttons 122 and 124 on the mount plate 116 of the steering wheel member 112 for down-shifting and up-shifting the forward speeds of vehicle 10 and a hand clutch shifter member 238 with a shifter cable 238c for depressing the clutch sub-assembly 206 of engine 202. This allows the driver while racing to always have his/her hands on the steering wheel member 112 for changing the forward speeds of the vehicle 10 when maneuvering the vehicle 10 around banked curves and on the straight away of the race track, and the driver uses his/her left foot for braking only via brake pedal 188 and his/her right foot for acceleration only via gas pedal 312.

In currently manufactured go-cart vehicles, the braking system of the vehicle is non-adjustable for controlling the amount of brake pressure exerted on the front and rear brakes in operational use, such that the front brakes of the racing vehicle were faster than the rear brakes of the racing vehicle which gives the driver poor control and handling when braking the vehicle around turns on the race track. Additionally, the vehicle does not stop properly when braking in emergency conditions which results in crashes of the vehicle because of improperly worn brake linings between the front and rear brakes. The present invention eliminates the aforementioned problems by having a bias control knob member 164 with an equalizer control sub-assembly 166. These components 164 and 166 afford the driver the ability to control the braking pressure within the front disc brakes assemblies 162a and 162b or within the rear disc brake assemblies 162c and 162d depending upon the racing track design (set-up) where the track is oval or a FIG. 8 or banked or dirt, etc. Additionally, the bias control knob member 164 gives the driver the ability to adjust brakes 162a to 162d depending upon his/her driving skills, techniques and abilities in handling and maneuvering the racing go-cart vehicle 10 at a particular race track having dry or wet conditions on the race track.

In currently manufactured go-cart vehicles there is no suspension systems within the structure of the go-cart vehicle which gives such vehicles poor handling, maneuverability and vehicular performance when racing in oval tracks. The present invention eliminates the aforementioned problems by having the tie rod, the steering column and the adjustable suspension assemblies 130, 140 and 280, respectively, all being connected together to afford the driver operator better handling, maneuverability and vehicular performance when driving in a variety of race tracks (i.e. oval, FIG. 8, banked, etc.)

In currently manufactured go-cart vehicles, the chassis frame design is tubular in structure and configuration such that the vehicle has poor aerodynamics which gives the overall vehicle poor handling performance in racing conditions. The present invention eliminates the aforementioned problem by having a chassis frame 20 made of a special carton-fiber design for providing an increase in downforce by the chassis frame 20 for better vehicle handling banked curves. Additionally, the chassis design and structure is such that the vehicular construction is much firmer, more rigid and stronger in case of impact or a crash with another vehicle or race wall for protecting the driver when the crash occurs to the vehicle 10.

The use of air compressor 250 and roll bar 260 in conjunction with the electronic shifter assembly 240 is unique and innovative to the racing go-cart vehicle 10 of the present invention. When vehicle 10 is in operational use the rear axle member 152 provides circular motion to pulleys 158 and 252p via pulley belt 252b of air compressor 250. This in turn provides air 18 from the air outlet port opening 254 through the outlet port air line 256 to inlet valve 268 of roll bar reservoir 264. Roll bar reservoir 264 then receives air 18 via air line 256 to the inlet valve opening 266 which then fills the air reservoir 264 to a maximum pressure. At maximum pressure the air 18 is released by the pressure release valve 278. The outlet valve 272 releases air 18 via air line 273 to the air actuator control inlet valve 245. Air actuator control outlet valves 243a and 243b are used in the electronic shifting of push-buttons 122 and 124 in order to down-shift or up-shift the racing vehicle 10 around curves, etc. via the actuator piston 248 when using the electronic shifter assembly 240. The first inlet valve 248a receives air 18 via air line 246a from outlet valve 243a such that actuator piston 248 moves in a down-shift mode. The second inlet valve 248b receives air 18 via air line 246b from outlet valve 243b such that actuator piston 248 moves in an up-shift mode.

ADVANTAGES OF THE PRESENT INVENTION

Accordingly, it is an advantage of the present invention is that it provides for a racing go-cart vehicle that allows for increased user safety when in operation by the driver; and for longer durability of the go-cart vehicle and its component parts in order to lower maintenance costs, replacement parts costs, and repair labor costs.

Another advantage of the present invention is that it provides for a racing go-cart vehicle that allows for an innovative aerodynamic configuration which includes a cover shell design that keeps the vehicle force downward and breaks that wind for faster vehicular speeds in the range of 125 to 130 mph; an adjustable front spoiler and a rear double spoiler for better handling and maneuverability by the driver around curves and on the straight-away when driving on the race track.

Another advantage of the present invention is that it provides for a racing go-cart vehicle that includes recessed rear wheel hubs and an improved body shell cover design that prevents the entanglement of hair and/or clothing to the driver while racing in order to deter possible injury or death to the driver.

Another advantage of the present invention is that it provides for a racing go-cart vehicle that allows for an electronic shifter with air actuators in which the steering wheel has push-button shifting for safer driving, such that the driver has his/her hands always on the steering wheel and the driver concentrates on driving in the race only. Additionally, the electronic shifter with air actuators of the present invention would have less mechanical failure than that of prior art electronic shifters; and would provide better performance and faster shifting.

Another advantage of the present invention is that it provides for a racing go-cart vehicle that has a steering wheel with push-button shifting that includes a shifter with six (6) forward speeds having three (3) buttons, such that a first button is used for down-shifting, a second button is used for up-shifting, and a third button is used for an electric starter.

Another advantage of the present invention is that it provides for a racing go-cart vehicle that allows for a safer and improved chassis design in order to protect the driver when a crash occurs to the vehicle; and for providing an increase in downforce by the chassis for better vehicle handling around banked curves. Additionally, the chassis is made of a special carbon-fiber design; such that the vehicular construction is much firmer and more rigid and stronger in case of impact with another racing vehicle.

Another advantage of the present invention is that it provides for a racing go-cart vehicle that allows for a KEVLAR™ body-shell cover for better aerodynamics; the shell is more durable and protects that driver on impacts or crashes, such that the shell will crack or tear only depending upon the total force of impact and will not splinter, as opposed to prior art plastic body-shell covers that would splinter on impact.

Another advantage of the present invention is that it provides for a racing go-cart vehicle that allows for an improved and innovative braking system that includes four wheel disc brakes with bias control between front and rear brakes for instant stopping of the racing vehicle for safe racing; wherein the bias control has an equalizer control assembly for more braking towards the front brakes or towards the rear brakes for better braking control and handling of the racing vehicle during operation.

Another advantage of the present invention is that it provides for a racing go-cart vehicle that allows for an improved adjustable suspension system wherein the front wheels each have a front wheel hub with adjustable suspension A-frames that permits the driver/mechanic to adjust for castor and camber of the racing vehicle for better handling, steering and vehicle performance, especially around turns.

Another advantage of the present invention is that it provides for a racing go-cart vehicle that includes a roll bar made out of a special steel alloy 4130 for protecting the driver if the race vehicle rolls over in a crash; and wherein the roll bar also acts as an air tank or air canister for containing air for the air actuators of the electronic shifter.

Another advantage of the present invention is that it provides for a racing go-cart vehicle that includes a water cooled 125 cc 40 hp motor wherein the water keeps the engine cooler, therefore the engine lasts longer for speeds at 125 mph or higher.

Another advantage of the present invention is that it provides for a racing go-cart vehicle that allows for racing wheels which will not interlock with other racing vehicles, and these racing wheels also include an improved design of king pins for use in the adjustable suspension assembly.

Another advantage of the present invention is that it provides for a racing go-cart vehicle that includes an air compressor attached to the vehicle chassis, such that the air compressor is actuated when the vehicle is moving (air compressor is connected to the rear axle) and the compressor pumps air into the roll bar for use in the air actuators of the electronic shifter.

Another advantage of the present invention is that it provides for a racing go-cart vehicle that includes an electric starter and wherein the steering wheel has a third push-button for electrically starting the racing go-cart vehicle after a spin out, a stall-out or for a normal start-up in operational use.

A further advantage of the present invention is that it provides for a racing go-cart vehicle that can be mass produced in an automated and economical manner and is readily affordable by the user or race track owners.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed:

1. A racing go-cart vehicle, comprising:
   a) a chassis having a top surface, a bottom surface, and front and rear sections; wherein said chassis includes a plurality of carbon-fiber layers having an inner core honeycomb structure;
   b) a pair of steerable front wheels and a pair of rear wheels having at least one drive wheel; said front wheels and said rear wheels being connected to said chassis;
   c) a tie rod operatively connected to said front wheels;
   d) a steering wheel having shift buttons thereon for push-button shifting of the vehicle; wherein said shift buttons for said push-button shifting further include a first push-button for down-shifting and a second push-button for up-shifting; and wherein said push-button shifting includes an electronic shifter having air actuators for providing shifting between six (6) forward speeds;
   e) a steering column connecting said steering wheel and said tie rod;
   f) universal joint means for articulating said steering column;
   g) a braking system attached to said front and rear wheels; wherein said braking system further includes four-wheel disc brakes having a bias control member and an equalizer control assembly for adjusting the braking control of either said front wheels or said rear wheels;
   h) adjustable suspension means connected to said front wheels;
   i) an engine mounted on said chassis;
   j) a rear axle and transmission means for transferring the output of said engine to said rear axle for driving said rear wheels;
   k) first driver operating means for regulating the speed of said engine;
   l) second driver operating means for actuating said braking system for stopping said vehicle;
   m) seating means for supporting a driver of said vehicle; and
   n) a roll bar attached to said chassis for protecting the driver when said vehicle rolls over in a crash; wherein said roll bar includes an air tank or air reservoir for containing air therein for use with said air actuators of said electronic shifter.

2. A racing go-cart vehicle in accordance with claim 1, further including a body-shell cover connected to said chassis and being made of plastic material for preventing splintering of said body-shell cover on impact of said vehicle.

3. A racing go-cart vehicle in accordance with claim 2, wherein said body-shell cover further includes an adjustable front spoiler and a rear double spoiler for improving handling and maneuverability by the driver of said vehicle around curves and on a straight-away on a race track.

4. A racing go-cart vehicle in accordance with claim 3, wherein said chassis includes a plurality of threaded mounting inserts for connecting said chassis to said body-shell cover, to said engine, and to said seating means.

5. A racing go-cart vehicle in accordance with claim 1, wherein said universal joint means includes an ackerman steering member for articulating said steering column.

6. A racing go-cart vehicle in accordance with claim 1, wherein said adjustable suspension means includes an adjustable suspension assembly system.

7. A racing go-cart vehicle in accordance with claim 6, wherein said adjustable suspension assembly system includes a pair of front wheel hubs each having therein an adjustable suspension A-frame in said front wheels for adjusting of castor and camber within each of said front wheel hubs for better handling, steering and vehicle performance around banked turns.

8. A racing go-cart vehicle in accordance with claim 1, wherein said engine is a water-cooled, 125 cc, 40 hp respiratory engine for achieving speeds greater than 125 mph.

9. A racing go-cart vehicle in accordance with claim 1, further including an electric starter, and wherein said engine is electronically connected to said electric starter for electronically starting said engine.

10. A racing go-cart vehicle in accordance with claim 9, further including a third push-button on said steering wheel for electronically starting said engine, and wherein said electric starter is electronically connected to said third push-button.

11. A racing go-cart vehicle in accordance with claim 1, wherein each of said wheels includes a wheel rim having a central cavity therein, and wherein said wheel rims include means for preventing interlocking with other racing vehicles when in operational use.

12. A racing go-cart vehicle in accordance with claim 1, wherein said first driver operating means includes a gas pedal for regulating the speed of said engine.

13. A racing go-cart vehicle in accordance with claim 1, wherein said second driver operating means includes a brake pedal for actuating said braking system for stopping said vehicle.

14. A racing go-cart vehicle in accordance with claim 1, wherein said transmission means includes a differential gear sub-assembly having a drive-train chain connected to said rear axle in order to drive said rear wheels.

15. A racing go-cart vehicle in accordance with claim 1, further including an air compressor connected to said chassis for producing air for activation of said air actuators of said electronic shifter.

16. A racing go-cart vehicle in accordance with claim 15, wherein said air compressor is mechanically connected to said rear axle of said rear wheels for producing air for said air actuators of said electronic shifter.

17. A racing go-cart vehicle in accordance with claim 15, wherein said chassis includes a plurality of threaded mounting inserts for connecting said chassis to said air compressor.

18. A racing go-cart vehicle in accordance with claim 1, wherein said roll bar is made of a steel alloy.

19. A racing go-cart vehicle in accordance with claim 1, wherein said seating means includes an adjustable and movable single seat.

20. A racing go-cart vehicle in accordance with claim 19, wherein said single seat has an adjustable seat bracket attached to said roll bar for movably adjusting said single seat forward or rearward on said adjustable seat bracket in order to adjust for the leg length of the driver.

21. A racing go-cart vehicle in accordance with claim 1, wherein said chassis includes a plurality of layers bonded together to form a composite chassis.

22. A racing go-cart vehicle in accordance with claim 21, wherein said plurality of layers of said chassis is selected from the group consisting of carbon fiber twill, carbon fiber, carbon fiber supports, adhesive film, phenolic resin, a plastic honeycomb, fiberglass tissue and unidirectional carbon fiber.

23. A racing go-cart vehicle in accordance with claim 1, wherein said chassis includes a plurality of threaded mounting inserts for connecting said chassis to said roll bar.

* * * * *